(12) United States Patent
Park

(10) Patent No.: US 9,738,019 B2
(45) Date of Patent: Aug. 22, 2017

(54) METHOD FOR MANUFACTURING THERMOPLASTIC SYNTHETIC RESIN PRODUCTS

(71) Applicant: Jang Won Park, Busan (KR)

(72) Inventor: Jang Won Park, Busan (KR)

( * ) Notice: Subject to any disclaimer, the term of this patent is extended or adjusted under 35 U.S.C. 154(b) by 500 days.

(21) Appl. No.: 14/366,994

(22) PCT Filed: Dec. 20, 2012

(86) PCT No.: PCT/KR2012/011212
§ 371 (c)(1),
(2) Date: Jun. 19, 2014

(87) PCT Pub. No.: WO2013/095022
PCT Pub. Date: Jun. 27, 2013

(65) Prior Publication Data
US 2015/0001759 A1    Jan. 1, 2015

(30) Foreign Application Priority Data
Dec. 20, 2011 (KR) .................. 10-2011-0137946

(51) Int. Cl.
*B29C 39/12* (2006.01)
*B29C 45/14* (2006.01)
(Continued)

(52) U.S. Cl.
CPC ...... *B29C 45/14786* (2013.01); *B29C 43/146* (2013.01); *B29C 45/40* (2013.01);
(Continued)

(58) Field of Classification Search
CPC .......... B29K 2105/256; B29K 2101/12; B29K 2105/0097; B29C 66/723; B29C 43/146;
(Continued)

(56) References Cited

U.S. PATENT DOCUMENTS 6,238,609 B1 * 5/2001 Stecker .................. B29C 41/22
264/246
2001/0019758 A1    9/2001 Hiraoka et al.

FOREIGN PATENT DOCUMENTS

JP       05-116169       5/1993
JP        6-826           1/1994
(Continued)

OTHER PUBLICATIONS

International Search Report for International Application No. PCT/KR2012/011212, dated Apr. 12, 2013.

*Primary Examiner* — Joseph S Del Sole
*Assistant Examiner* — John Robitaille
(74) *Attorney, Agent, or Firm* — Kile Park Reed & Houtteman PLLC

(57) ABSTRACT

Disclosed is a method of manufacturing a thermoplastic synthetic resin product, including preparing a mold having a cavity formed in a predetermined shape; filling the cavity of the mold with a thermoplastic synthetic resin material in an amount greater than the volume of the cavity of the mold; heating the mold under pressure; releasing the pressure when the thermoplastic synthetic resin material charged in the cavity of the mold is melted by heating, and opening the mold; removing, of the melted thermoplastic synthetic resin material in the opened mold, the material other than the material charged in the cavity of the mold; placing either a fabric or a hot melt on the mold having the cavity filled with the thermoplastic synthetic resin material; and cooling the mold under pressure, thus integrating either the fabric or the hot melt with the thermoplastic synthetic resin material in contact with either the fabric or the hot melt.

9 Claims, 16 Drawing Sheets

(51) Int. Cl.
*B29C 43/14* (2006.01)
*B29C 45/40* (2006.01)
*B29C 45/72* (2006.01)
*B29C 65/00* (2006.01)
*B29C 65/02* (2006.01)
*B29K 101/12* (2006.01)
*B29K 105/00* (2006.01)

(52) U.S. Cl.
CPC ........ *B29C 45/7207* (2013.01); *B29C 65/028* (2013.01); *B29C 66/3494* (2013.01); *B29C 66/472* (2013.01); *B29C 66/723* (2013.01); *B29C 66/729* (2013.01); *B29C 66/7392* (2013.01); *B29C 66/73921* (2013.01); *B29K 2101/12* (2013.01); *B29K 2105/0097* (2013.01); *B29K 2105/256* (2013.01)

(58) Field of Classification Search
CPC ................ B29C 45/40; B29C 45/7207; B29C 66/73921; B29C 66/3494; B29C 66/729; B29C 65/028; B29C 45/14786; B29C 66/7392; B29C 66/472
See application file for complete search history.

(56) References Cited

FOREIGN PATENT DOCUMENTS

| | | |
|---|---|---|
| JP | 09-001586 | 1/1997 |
| JP | 2002-240083 | 8/2002 |
| JP | 2005-104083 | 4/2005 |
| KR | 90-004837 | 7/1990 |
| KR | 10-2002-0042559 | 6/2002 |
| KR | 10-2011-0135227 | 12/2011 |

\* cited by examiner

US 9,738,019 B2

METHOD FOR MANUFACTURING THERMOPLASTIC SYNTHETIC RESIN PRODUCTS

TECHNICAL FIELD

The present invention relates to a method of manufacturing a thermoplastic synthetic resin product, and more particularly, to a method of manufacturing a thermoplastic synthetic resin product, comprising preparing a mold having a cavity formed in a predetermined shape; filling the cavity of the mold with a thermoplastic synthetic resin material in an amount greater than the volume of the cavity of the mold; heating the mold under pressure; releasing the pressure when the thermoplastic synthetic resin material charged in the cavity of the mold is melted by heating, and opening the mold; removing, of the melted thermoplastic synthetic resin material in the opened mold, the material other than the material charged in the cavity of the mold; placing either a fabric or a hot melt on the mold having the cavity filled with the thermoplastic synthetic resin material; and cooling the mold under pressure, thus integrating either the fabric or the hot melt with the thermoplastic synthetic resin material in contact with either the fabric or the hot melt.

BACKGROUND ART

Typically, thermoplastic synthetic resin has the characteristic that, when it is heated, the molecular bonding thereof breaks and thus it dissolves while becoming fluid to thereby be capable of changing the shape thereof, and also when the heated resin is cooled, it may be hardened and re-shaped, thus enabling the recycling thereof. Recently in the fields of protective cases for sports and various home appliances, a variety of shock-proof cushioning products resulting from binding thermoplastic synthetic resin molded products with fabric have been introduced.

A representative method for binding the thermoplastic synthetic resin molded product with the fabric is use of an adhesive. Although this method is very simple and may be easily performed by anyone, it suffers from complicated working processes, high defective rates and environmental pollution, and thus its application range becomes narrow. As alternatives thereto, Japanese Patent Application Publication No. 1997-001586 and Korean Patent Application Publication No. 2002-0042559 disclose a method of integrating a fabric with a thermoplastic synthetic resin material using a mold.

This method includes preparing a mold having a cavity corresponding to the shape of a final product, placing a fabric on the cavity of the mold, closing the mold, and filling a space between the fabric and the cavity of the mold with a molten thermoplastic synthetic resin material so that the fabric and the synthetic resin material are integrated. Briefly, this method is performed in such a manner that a thermoplastic synthetic resin material is injected into the cooled mold, and advantageously enables mass production of molded products in the shape of the cavity of the mold.

However, this method is problematic because the fluid thermoplastic synthetic resin maintained at a predetermined temperature or more is injected into the mold maintained at a relatively low temperature and then undergoes cold molding in the shape of the cavity of the mold, undesirably causing defects where the cavity of the mold is not fully filled with the molten thermoplastic synthetic resin or where the resin is excessively injected into the mold such that it overflows the cavity of the mold. Moreover, final products are defective to the extent that they cannot be restored, and hence, solutions thereto are urgently required.

DISCLOSURE

Technical Problem

Accordingly, the present invention has been made keeping in mind the above problems occurring in the related art, and an object of the present invention is to provide a method of manufacturing a thermoplastic synthetic resin product, in which individual thermoplastic synthetic resin materials may be easily provided on the surface of a fabric or a hot melt without overflow at the edges thereof.

Another object of the present invention is to provide a thermoplastic synthetic resin product, which has visually clear color boundaries between thermoplastic synthetic resin materials having different colors, or obvious material boundaries between the thermoplastic synthetic resin materials and the fabric or the hot melt, without limitation on the shape and material characteristics of thermoplastic synthetic resin materials.

Still another object of the present invention is to provide a method of integrating a thermoplastic synthetic resin with a fabric using only a molding process, instead of cutting the thermoplastic synthetic resin to a predetermined shape using a cutting knife and adhering it to the upper surface of a fabric using an adhesive.

Yet another object of the present invention is to provide a method of integrating a thermoplastic synthetic resin with a fabric or a hot melt, wherein, regardless of the shape of a mold and various properties of the thermoplastic synthetic resin material, any thermoplastic synthetic resin having any thickness and design may be integrated with a fabric or a hot melt.

Further yet another object of the present invention is to provide a method of integrating a thermoplastic synthetic resin with a hot melt, wherein the resin may be integrated with the hot melt and may be easily adhered to an adhesion target by means of heating.

Technical Solution

In order to accomplish the above objects, the present invention provides a method of manufacturing a thermoplastic synthetic resin product, comprising preparing a mold having a cavity formed in a predetermined shape; filling the cavity of the mold with a thermoplastic synthetic resin material in an amount greater than the volume of the cavity of the mold; heating the mold under pressure; releasing the pressure when the thermoplastic synthetic resin material charged in the cavity of the mold is melted by heating, and opening the mold; removing, of the melted thermoplastic synthetic resin material in the opened mold, the material other than the material charged in the cavity of the mold; placing either a fabric or a hot melt on the mold having the cavity filled with the thermoplastic synthetic resin material; and cooling the mold under pressure, thus integrating either the fabric or the hot melt with the thermoplastic synthetic resin material in contact with either the fabric or the hot melt.

In addition, the present invention provides a method of manufacturing a thermoplastic synthetic resin product, comprising preparing a mold having a plurality of cavities formed in a predetermined shape; filling some of the cavities of the mold with a first thermoplastic synthetic resin material in an amount greater than the volume of some of the cavities of the mold; heating the mold under pressure; releasing the pressure when the first thermoplastic synthetic resin material of the mold is melted by heating, and opening the mold; removing, of the melted first thermoplastic synthetic resin material in the opened mold, the first material other than the first material charged in some of the cavities of the mold; filling the remaining empty cavity of the mold which is not filled with the melted first thermoplastic synthetic resin material, with a second thermoplastic synthetic resin material having a different color or different color and properties from those of the first thermoplastic synthetic resin material; heating the mold under pressure; releasing the pressure when the second thermoplastic synthetic resin material is melted by heating, and opening the mold; removing, of the melted second thermoplastic synthetic resin material in the opened mold, the second material other than the second material charged in the cavity of the mold; placing either a fabric or a hot melt on the mold having the cavities filled with the first and the second thermoplastic synthetic resin material; and cooling the mold under pressure, thus integrating either the fabric or the hot melt with the first and the second thermoplastic synthetic resin material which are in contact with either the fabric or the hot melt.

In addition, the present invention provides a method of manufacturing a thermoplastic synthetic resin product, comprising preparing a mold having a plurality of cavities formed in a predetermined shape; filling the cavities of the mold with a first thermoplastic synthetic resin material in an amount smaller than the volume of the cavities of the mold, and then with a second thermoplastic synthetic resin material in an amount greater than the remaining volume of the cavities of the mold; heating the mold under pressure; releasing the pressure when the first and the second thermoplastic synthetic resin material of the mold are melted by heating, and opening the mold; removing, of the melted second thermoplastic synthetic resin material in the opened mold, the second material other than the second material charged in the cavities of the mold; placing either a fabric or a hot melt on the mold having the cavities sequentially filled with the first and the second thermoplastic synthetic resin material; and cooling the mold under pressure, thus integrating the second thermoplastic synthetic resin material with the first thermoplastic synthetic resin material and either the fabric or the hot melt, which are in contact with both sides of the second thermoplastic synthetic resin material.

In addition, the present invention provides a method of manufacturing a thermoplastic synthetic resin product, comprising preparing at least two first molds having cavities formed in a predetermined shape; filling the cavities of the first molds with a thermoplastic synthetic resin material in an amount greater than the volume of the cavities of the first molds; heating the first molds under pressure; releasing the pressure when the thermoplastic synthetic resin material of the first molds is melted by heating, and opening the first molds; removing, of the melted thermoplastic synthetic resin material in the opened first molds, the material other than the material charged in the cavities of the first molds; disposing the first molds having the cavities filled with the thermoplastic synthetic resin material in cavities of a second mold with a predetermined shape; placing either a fabric or a hot melt on the first molds disposed in the cavities of the second mold and having the cavities filled with the thermoplastic synthetic resin material; and cooling the second mold under pressure, thus integrating either the fabric or the hot melt with the thermoplastic synthetic resin material of the first molds in contact with either the fabric or the hot melt.

In addition, the present invention provides a method of manufacturing a thermoplastic synthetic resin product, comprising preparing at least two molds having cavities formed in a predetermined shape; filling the cavities of the respective molds with thermoplastic synthetic resin materials having different colors or different colors and properties in an amount greater than the volume of the cavities of the molds; heating the molds under pressure; releasing the pressure when the thermoplastic synthetic resin materials of the molds are melted by heating, and opening the molds; removing, of the melted thermoplastic synthetic resin materials in the opened molds, the materials other than the materials charged in the cavities of the molds; placing either a fabric or a hot melt on any one of the molds having the cavities filled with the thermoplastic synthetic resin materials; combining the molds such that the thermoplastic synthetic resin materials charged in the cavities thereof face each other while either the fabric or the hot melt is disposed therebetween; and cooling the combined molds under pressure, thus integrating either the fabric or the hot melt with the thermoplastic synthetic resin materials of the molds in contact with either the fabric or the hot melt.

Preferably, the thermoplastic synthetic resin material charged in each of the first molds has a different color or different color and properties.

The first thermoplastic synthetic resin material may comprise a hot melt.

Advantageous Effects

According to the present invention, when a thermoplastic synthetic resin material having a specific color or specific color and properties begins to be melted, the mold is opened, and only the unnecessary material at the other portions except for the intended cavity of the mold can be effectively removed. Even without the use of an adhesive or without performing a sewing process as in the related art, high-quality thermoplastic synthetic resin products having various colors and designs can be provided on the surface of a fabric or a hot melt.

In lieu of introducing the weighed thermoplastic synthetic resin material into a mold to perform cold molding, the present invention is implemented in such a manner that, when the intended cavity of the mold is fully filled with the melted thermoplastic synthetic resin material, the unnecessary material is removed and then cold molding is carried out. Thereby, the resulting thermoplastic synthetic resin product can have visually clear color boundaries between thermoplastic synthetic resin materials having different colors, or obvious material boundaries between the thermoplastic synthetic resin materials and the fabric or the hot melt, without limitation on the shape and material characteristics of thermoplastic synthetic resin materials on the surface of the fabric or the hot melt.

Also, according to the present invention, the melted thermoplastic synthetic resin material can naturally penetrate into the tissue of the fabric and is thus integrated with the fabric during a molding process, or is integrated with the hot melt, thereby providing a thermoplastic synthetic resin product having high adhesion durability without the use of an additional adhesive.

Also, according to the present invention, even when designs have very complicated shapes, the material can be easily integrated with the surface of the fabric or the hot melt using only a cold molding process, without the need for complicated processes involving cutting the molded thermoplastic synthetic resin product and adhering it to the fabric or the hot melt.

Also, according to the present invention, when the thermoplastic synthetic resin is integrated with the hot melt, the resulting thermoplastic synthetic resin product can be easily adhered to an adhesion target by means of heating.

BEST MODE

Hereinafter, a detailed description will be given of preferred embodiments of the present invention with reference to the appended drawings. In the following description, it is to be noted that, when there are portions which have no direct relation with the technical features of the present invention, are apparent to those having ordinary knowledge in the art and overlap in individual embodiments, a detailed description of those portions will be omitted.

Figure 1:
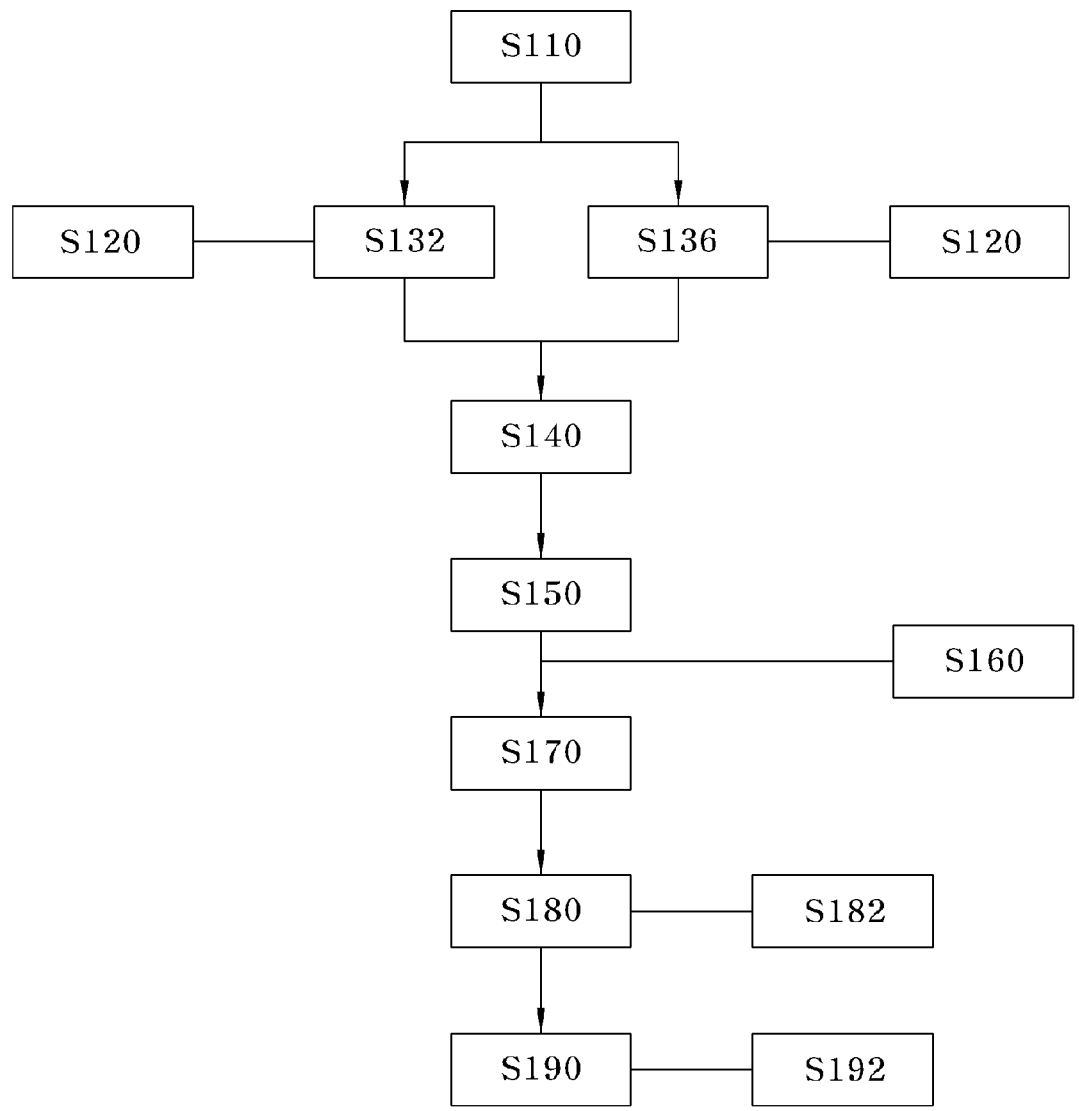
FIG. 1 schematically illustrates a manufacturing process according to an embodiment of the present invention.

FIG. 1 illustrates a process of manufacturing a thermoplastic synthetic resin product according to a preferred embodiment of the present invention. As illustrated in this drawing, the method of manufacturing the thermoplastic synthetic resin product according to the present invention comprises preparing a mold (S110), filling the mold with a thermoplastic synthetic resin material (S132, S136), heating the mold (S140), opening the mold (S150), partially removing the material (S170), providing either a fabric or a hot melt (S180), and crosslinking and cold molding either the fabric or the hot melt with the molding material in contact with either the fabric or the hot melt (S190).

The mold has an inner space in a predetermined shape. The inner space of the mold corresponds to a cavity to be filled with a thermoplastic synthetic resin material which will be described later, and is preferably provided in recessed form. The mold according to the present invention may have a cavity or a plurality of cavities, depending on the number of cavities, and also the cavity of the mold may have a planar shape, a three-dimensional shape or a combination thereof, depending on the structure thereof.

When the mold has a cavity in a three-dimensional shape, it may include a typical mold the inner space of which is three-dimensionally recessed to form a cavity, and a mold composite comprising a mold core which has a three-dimensional shape and has a cavity formed in a predetermined shape on the surface thereof and a mold body the inner surface of which has a cavity corresponding to the shape of the outer surface of the mold core except for the recessed cavity of the mold core so as to be coupled with the mold core. When the mold has a plurality of cavities, the cavities may be configured such that they may be connected to each other, one or more of them may be separately formed from the remaining cavities, or all of them may be spaced apart from each other, which are merely illustrative and the present invention is not limited thereto.

Figure 2:
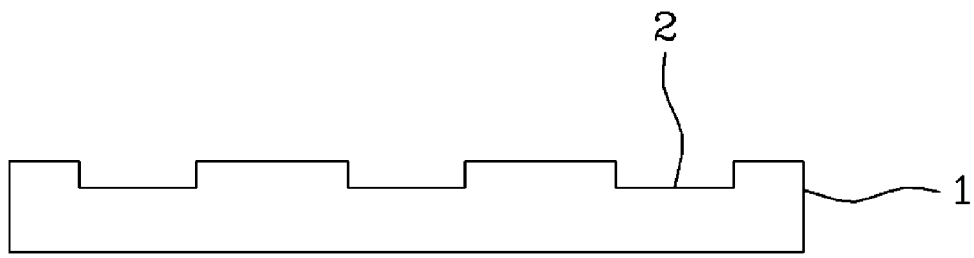
FIGS. 2 to 6 schematically illustrate some of the manufacturing process of FIG. 1.

The cavities of the mold, having various shapes, are preferably formed to possess the same contour as a final thermoplastic synthetic resin product. The present invention does not exclude the cavity structure of the mold which includes a first cavity on which a fabric is placed, and a second cavity recessed on the surface of the first cavity and filled with a thermoplastic synthetic resin material. FIG. 2 illustrates a mold 1 having a plurality of individual cavities 2 therein.

Figure 3:
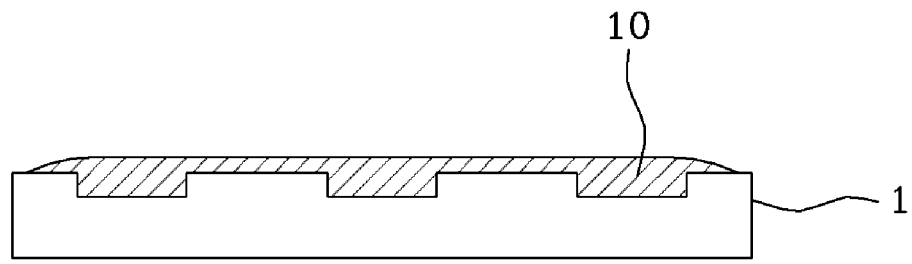

After preparation of the mold, as illustrated in FIG. 3, the cavities of the mold are filled with a thermoplastic synthetic resin material 10 having a predetermined color and quality. The volume (amount) of the material charged in the cavities of the mold is preferably set to be greater than the volume of the cavities of the mold, as illustrated in the drawing. According to the present invention, filling the cavities of the mold with the thermoplastic synthetic resin material may involve the following two processes. In one process, the mold is opened and the thermoplastic synthetic resin material is directly charged in the cavities thereof (S132). As such, the material used therefor is preferably in a solid phase. When the material is in a solid phase, the shape thereof may be formed so as to correspond to the shape of the cavities.

In the other process, the mold is closed and the thermoplastic synthetic resin material is charged in the cavities thereof using a device such as a material injector of an injection machine (S136). As such, the material in a solid phase is heated at low temperature by means of a heater provided in the device and thus softened, and is then supplied into the cavities through the material inlet and the material injection path of the closed mold. In the present invention, the amount of the thermoplastic synthetic resin material which is directly charged in the cavities of the mold or is supplied using the device is not limited so long as it is greater than the volume of the cavities, and may be arbitrarily determined depending on the type of product. The method according to the present invention is quite different from a conventional method where the volume of the cavities of the mold adapted for different colors and the amount of the charged material must be exactly the same as each other without a precise deviation range upon integral cold molding of a multi-colored product.

The thermoplastic synthetic resin material (which is a concept including both a first thermoplastic synthetic resin material and a second thermoplastic synthetic resin material, as will be described later) according to the present invention may be selected from among materials which are typically used in the related art.

After filling of the inner space of the mold with the thermoplastic synthetic resin material, the mold is closed so that the charged material does not flow out of the mold, after which the mold is heated under a predetermined pressure (S140). When heat is continuously applied to the mold, the thermoplastic synthetic resin material melted by such heat is first charged in the cavities at a comparatively lower position of the mold and then an excess of the melted material is positioned on the surface and the periphery around the cavities, except for the cavities. The surplus of the material, which is supplied to be greater than the volume of the cavities, transgresses the boundaries of the cavities of the mold.

When the molding material reaches any point of time at which it is melted beyond a softening temperature thereof by the heat which is continuously transferred under pressure, the pressure is released and the mold is opened (S150). Opening the mold is preferably performed at any one selected from among a point of time at which the thermoplastic synthetic resin material begins to be melted beyond the softening temperature by heat to thus be converted into a viscous material, a point of time at which it is converted into a molten liquid beyond the melting temperature, and a completely molten liquid.

Figure 4:
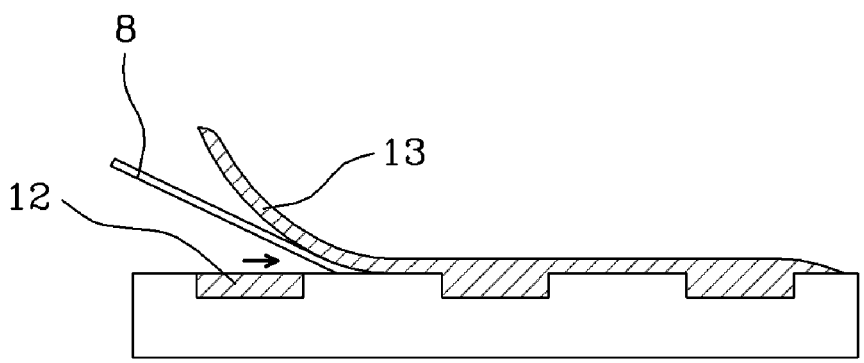

Next, the thermoplastic synthetic resin material, other than the thermoplastic synthetic resin material charged in the cavities of the opened mold, is removed (S170). Removal of the unnecessary material according to the present invention may be arbitrarily selected from among various methods, including removing the melted material from the mold maintained at a predetermined temperature using a removal means, and cooling the mold to convert the material into a solid and removing the solid material using a heated removal means. When the latter method is chosen, a certain unit which may be heated to a temperature equal to or higher than the minimum softening temperature of the material may be provided to the end of the removal means. The removal means may be a knife having a predetermined width. FIG. 4 illustrates S170 where an excess of the melted thermoplastic synthetic resin material 13 which is located at the other portions except for the cavities, other than the thermoplastic synthetic resin material 12 charged in the cavities, is removed using a removal means 8 such as a knife.

Also, removing the unnecessary material (S170) may include separating the thermoplastic synthetic resin material from the cavities of the mold and then removing more clearly the unnecessary material thereof. This may be identically applied to the following embodiments.

After removal of the material other than the material in the cavities, either a fabric or a hot melt is placed on the upper surface of the mold having the cavities filled with the material, and the mold is closed (S180).

The fabric is not limited so long as it has the structure and tissue into which the melted thermoplastic synthetic resin material may penetrate or may be incorporated by the inner pressure of the mold during the subsequent crosslinking process, and the fabric may include any one selected from among knitted and woven fabrics of natural or synthetic materials. Also, because the fabric has no relation with stretchability, it may have no stretachability or is stretchable in any one or more directions. In addition to the fabric as above, nonwoven fabric made of natural or synthetic material, natural leather, and synthetic leather processed from woven or nonwoven fabric may be used so long as the molding material may penetrate or may be incorporated therein. Furthermore, in addition to the attachment target material as above, so long as the molding material may be attached, a thermoplastic resin film having the same or different softening temperature or melting temperature from that of the molding material or any material processed from a woven or nonwoven fabric on the surface of which the thermoplastic resin film is provided may be used.

On the other hand, the hot melt is composed of a thermoplastic synthetic resin and is widely known to be an adhesive for easily adhering two objects in such a manner that it is melted by heat, compressed to an adhesion target and then cooled. The hot melt may be characterized by being easily integrated with the melted thermoplastic synthetic resin material in the heated mold, as will be described later. The hot melt may be provided in any form, such as a sheet, a film or a nonwoven fabric, so that it may be placed on the upper surface of the melted thermoplastic synthetic resin material. Also, the hot melt may be provided in the form of pellet or powder, and may thus be applied on the upper surface of the melted thermoplastic synthetic resin material. The hot melt may be arbitrarily selected from among materials widely used in the related art, including TPU (Thermoplastic Polyurethane) hot melt, PA (Polyamide) hot melt, EVA (Ethane-vinyl acetate copolyester) hot melt, and PES (Copolyester) hot melt.

Figure 5:
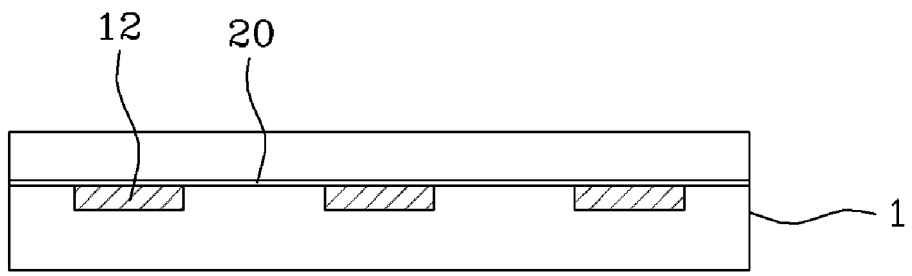

FIG. 5 illustrates placing either the fabric or the hot melt 20 on the upper surface of the mold having the cavities filled with the thermoplastic synthetic resin material 12 and then closing the mold. Unlike this, when the mold is provided in the form of a mold composite comprising a mold core having cavities on the surface thereof and a mold body coupled with the mold core, either the fabric or the hot melt may be placed in a manner that covers the entire outer surface of the mold core having the cavities filled with the softened and melted material or that partially covers the outer surface of the metal core including at least the cavities.

Figure 6:
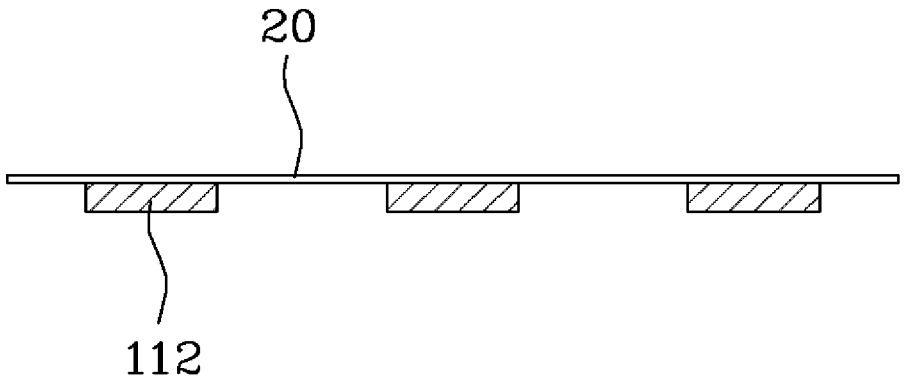

Next, the thermoplastic synthetic resin material in contact with either the fabric or the hot melt is subjected to cold molding in the closed mold under pressure. Accordingly, the thermoplastic synthetic resin material, which has penetrated into the cavities of the mold and the surface and tissue of the fabric, is integrated with the fabric and thus attached to the fabric, or is integrated with the hot melt. When the thermoplastic synthetic resin material is integrated in this way, the pressure is released and the mold is rapidly opened (S190). After completion of the cold molding process, as illustrated in FIG. 6, a thermoplastic synthetic resin product may result, which includes the thermoplastic synthetic resin 112 molded in a predetermined shape on the surface of either the fabric or the hot melt 20.

The thermoplastic synthetic resin product according to the present invention obviates the need for any adhesion means for bonding either the fabric or the hot melt and the thermoplastic synthetic resin molded product to each other. Moreover, there occurs no color invasion at the outer boundaries between the adjacent portions of the thermoplastic synthetic resin molded products on the surface of the same fabric or hot melt. The reason is that, when the cavities are filled with the thermoplastic synthetic resin material, the material is converted to be viscous or molten and then fully charged in the cavities having a predetermined shape, after which the mold is opened under the condition that the material is melted, and thus an excess of the unnecessary material is separately removed. This method is apparently different from a conventional adhesion method wherein the thermoplastic synthetic resin molded product subjected to cold molding undergoes additional and subsequent processes such as secondary compressive molding or cutting after cooling, and thus it is sewn or adhered. Therefore, the present invention enables the formation of thermoplastic synthetic resin products having various shapes with diverse designs and colors, without the need for the additional process such as an adhesion process after the cooling process.

Meanwhile, the present invention may include providing a release means (S120) before heating the mold filled with the thermoplastic synthetic resin material (S140), and removing the provided release means (S160) after opening the mold. The release means is used to easily separate the melted thermoplastic synthetic resin material from the inner surface of the cavities of the mold upon opening the mold. When the material is in a solid phase, the release means is preferably provided after charging the material in the cavities. When the softened thermoplastic synthetic resin material is supplied using the material injector of an injection machine, the release means is preferably provided before supplying the material into the cavities of the closed mold. Examples of the release means may include a highly releasable film, a fabric, and a releasable resin applied on a portion of the material charged in the inner space of the mold, which are merely illustrative, and such a release means may be selected from among various means so long as it prevents strong adhesion between the inner surface of the mold and the material and ensures rapid approach to the surface of the melted material which has been converted to be viscous.

The surface (the surface opposite the surface in contact with the melted material) of either the fabric or the hot melt placed inside the mold, other than the surface in contact with the thermoplastic synthetic resin material, may be damaged by heat which is continuously applied from the surface of the mold. Thus, the present invention may include providing a protection means between either the fabric or the hot melt and the inner surface of the mold (S182) after placing either the fabric or the hot melt on the mold, and removing the provided protection means (S192) after finally opening the mold. Examples of the protection means may include a heat-resistant resin film, a molded material, a fabric, and a heat-resistant resin partially applied on the fabric, which are merely illustrative, and such a protection means may be arbitrarily selected from among various methods adapted for products.

Also, when the fabric is used, the present invention may include providing an adhesion means between the material and the fabric before placing the fabric on the upper surface of the material, in order to enhance the extent of adhesion between the fabric and the thermoplastic synthetic resin material. The adhesion means plays a role in strengthening the adhesion between the fabric and the thermoplastic synthetic resin material in the course of cold molding, and may be arbitrarily selected from among various adhesion means, and the shape thereof is not limited.

Also, when the thermoplastic synthetic resin material is integrated with the hot melt in lieu of the fabric in the present invention, the resulting thermoplastic synthetic resin product may be easily adhered to an adhesion target by means of heating due to the characteristics of the hot melt. This feature may exhibit the same in the following embodiments.

Figure 7:
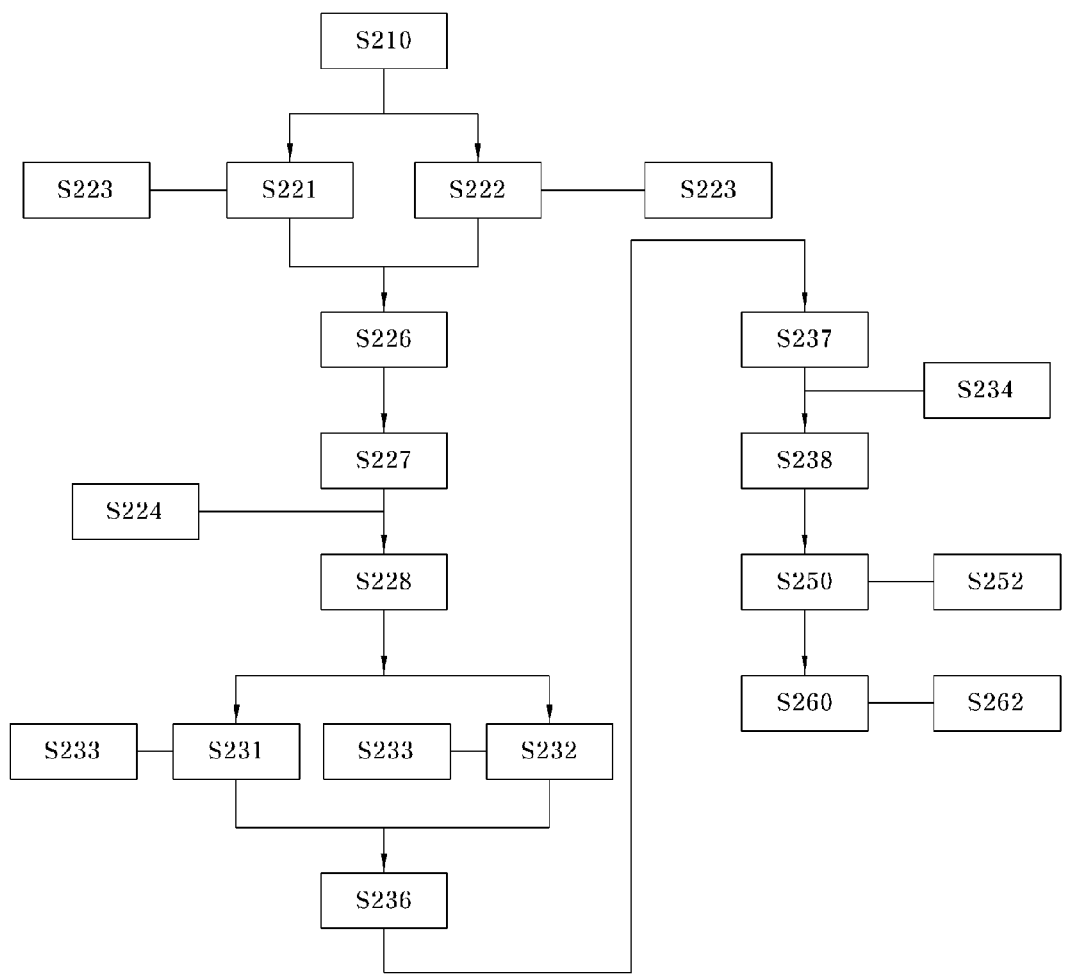
FIG. 7 schematically illustrates a manufacturing process according to another embodiment of the present invention.

FIG. 7 illustrates a process of manufacturing a thermoplastic synthetic resin product according to another preferred embodiment of the present invention. This embodiment provides a method that is able to easily manufacture a product comprising thermoplastic synthetic resin molded products having multiple colors and properties on the surface of either the fabric or the hot melt, using a single mold. The description of this embodiment, which overlaps with the aforementioned embodiment and to which the description of the aforementioned embodiment may be identically applied, will be omitted.

Figure 8:
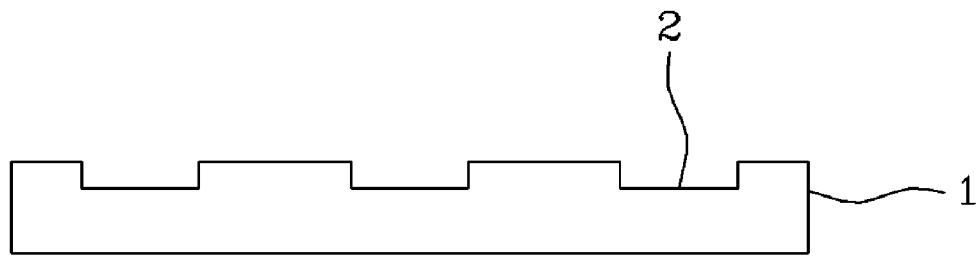
FIGS. 8 to 14 schematically illustrate some of the manufacturing process of FIG. 7.
Figure 9:
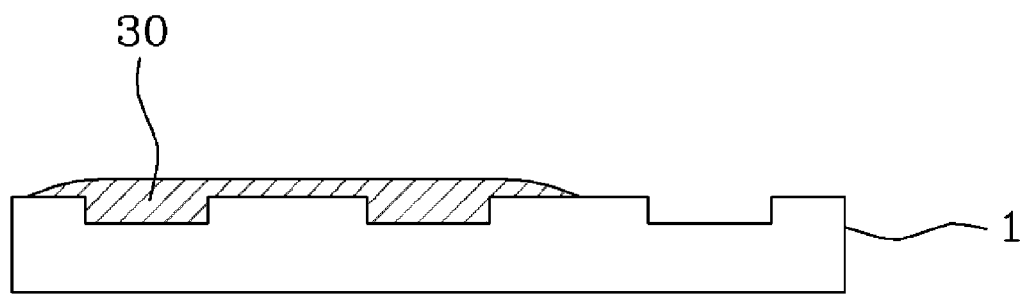

As illustrated in FIG. 8, a mold 1 having cavities 2 therein is prepared (S210). Subsequently, as illustrated in FIG. 9, some of the cavities of the mold are filled with a first thermoplastic synthetic resin material 30 having a predetermined color. Whether any cavities are selected is completely arbitrary. Filling the selected cavities with the first thermoplastic synthetic resin material may be divided into the case where the first material is in a solid phase (S221) and the case where the first material in a solid phase is heated and softened (S222), which may remain the same as described above.

Figure 10:
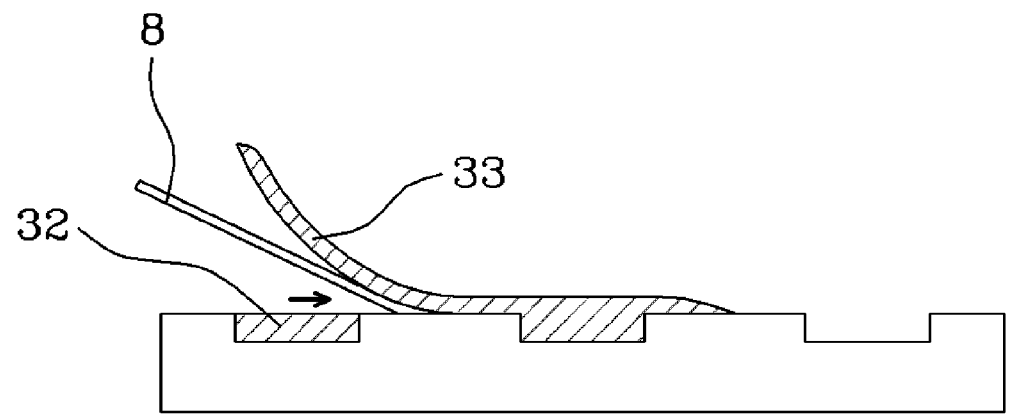

After filling of the selected cavities with the first thermoplastic synthetic resin material, the mold is closed and then heated under pressure, thus melting the first material (S226), and when the selected cavities are fully filled with the melted first material, the pressure is released and the mold is opened (S227). Next, an excess of the first material, which is located at the other portions except for the selected cavities of the opened mold, is removed (S228). FIG. 10 illustrates removing an excess of the unnecessary first material 33 which is melted, other than the first material 32 charged in the selected cavities, using a removal means 8.

Figure 11:
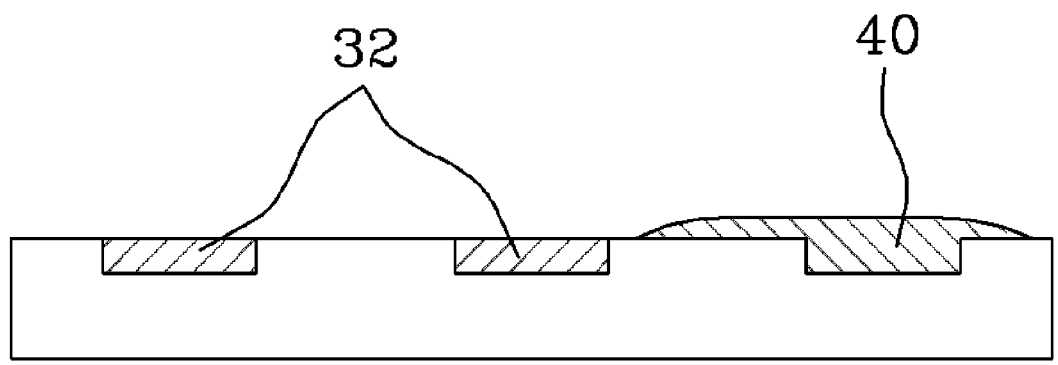

After removal of an excess of the melted first material, as illustrated in FIG. 11, the remaining cavity, which is not filled with the melted first material, may be filled with a second thermoplastic synthetic resin material 40 having a different color or different color and properties from those of the first material, and the mold is closed and heated under pressure, thus melting the second material (S236). Filling the remaining cavity of the mold with the second material having a different color may be divided into the case where the second material is in a solid phase (S231) and the case where the second material in a solid phase is heated and softened (S232), which may remain the same as described above.

Figure 12:
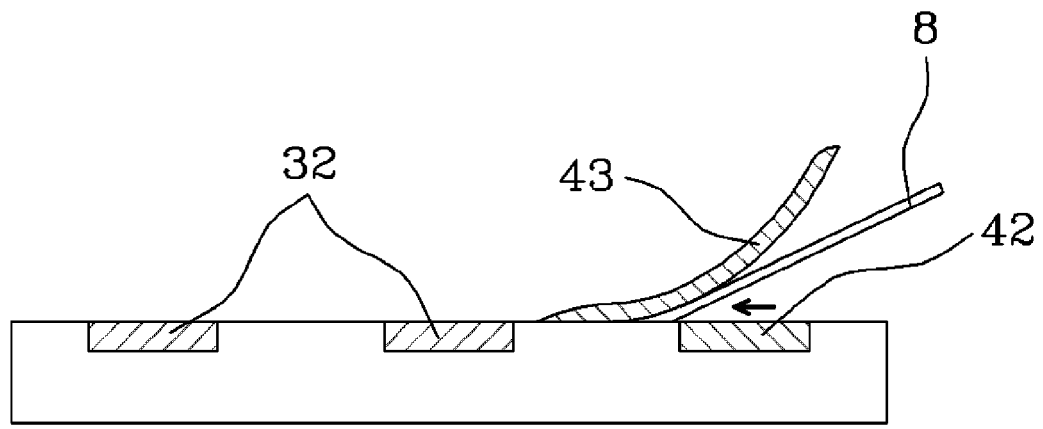

When the second material is melted beyond the softening temperature by the transferred heat and is thus fully charged in the remaining cavity other than the cavities filled with the first material, the mold is opened (S237), and as illustrated in FIG. 12, an excess of the second material 43 which is located at the other portions except for the selected cavity 42 is removed using a removal means 8 (S238).

Figure 13:
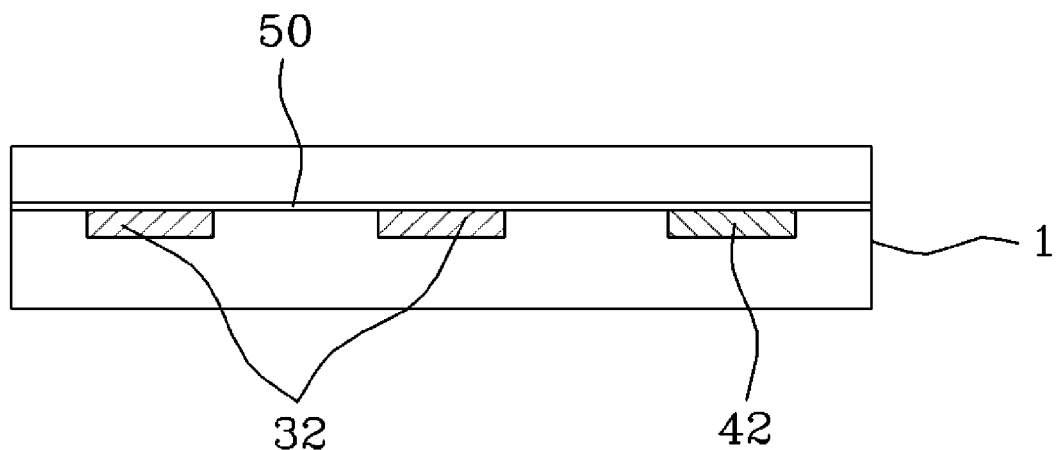

Next, as illustrated in FIG. 13, either a fabric or a hot melt 50 is placed on the upper surface of the mold having the cavities filled with the first material 32 and the second material 42, and the mold is closed (S250).

Figure 14:
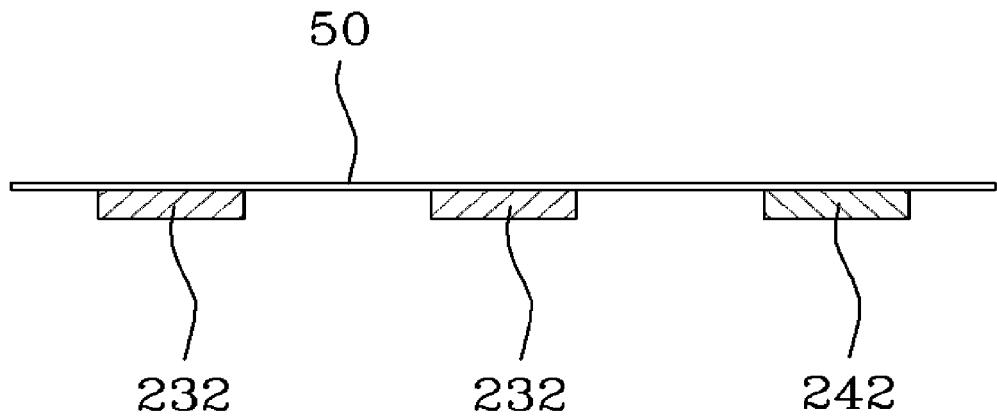

After closing of the mold, the mold is subjected to cold molding under pressure, so that the first material and the second material which are in contact with either the fabric or the hot melt are integrated. Accordingly, individual materials, which have penetrated into the cavities of the mold and the surface and tissue of the fabric, are integrated with the fabric and thus attached thereto, or are integrated with the hot melt. When the individual materials having penetrated into the surface and tissue of the fabric are integrated with the fabric or are integrated with the hot melt in this way, the pressure is released and the mold is rapidly opened (S260). After completion of the cold molding process, as illustrated in FIG. 14, a thermoplastic synthetic resin product may result, which includes thermoplastic synthetic resin molded products 232, 242 having various colors and properties and formed in a predetermined shape on the surface of either the fabric or the hot melt 50.

Also in this embodiment as in the aforementioned embodiment, providing a release means may be performed before heating the mold filled with individual materials, and removing the release means may be performed after opening the mold. Specifically, providing the release means (S223, S233) may be executed at any one or all steps selected from among charging the first material (S221, S222) and charging the second material (S231, S232), and the specific step of providing the release means may vary depending on the characteristics (solid state or softened state) of the first material, which may remain the same as mentioned above. The provided release means is preferably removed (S224, S234) after opening the mold (S227, S238).

Also in this embodiment, in order to protect either the fabric or the hot melt placed inside the mold from the transferred heat, providing a protection means between either the fabric or the hot melt and the inner surface of the mold (S252) may be performed after placing either the fabric or the hot melt on the mold, and removing the protection means (S262) may be conducted after finally opening the mold.

Also in this embodiment, in order to enhance the extent of adhesion between the fabric and the thermoplastic synthetic resin material, providing an adhesion means between the material and the fabric may be performed before placing the fabric on the upper surface of the material.

Figure 15:
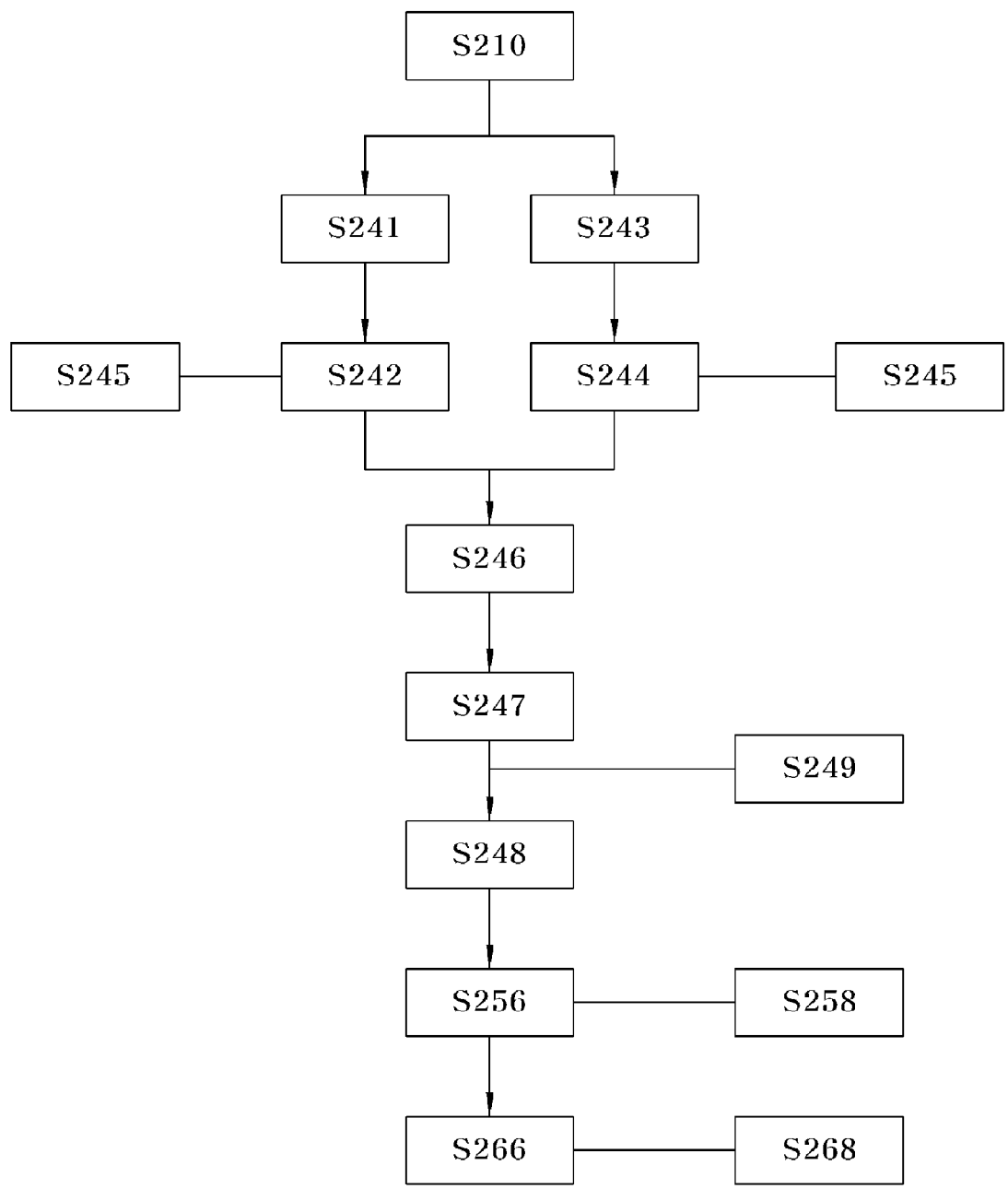
FIG. 15 schematically illustrates a manufacturing process according to still another embodiment of the present invention.

In addition, FIG. 15 illustrates a process of manufacturing a thermoplastic synthetic resin product according to still another preferred embodiment of the present invention. This embodiment provides a method that is able to easily manufacture a product comprising thermoplastic synthetic resin molded products having multiple colors and properties on the surface of either the fabric or the hot melt, using a single mold, like the aforementioned embodiment. However, this embodiment is different from the aforementioned embodiment, in terms of filling the same cavities with different thermoplastic synthetic resin materials to form thermoplastic synthetic resin molded products. The description of this embodiment, which overlaps with the aforementioned embodiments and to which the description of the aforementioned embodiments may be identically applied, will be omitted.

Figure 16:
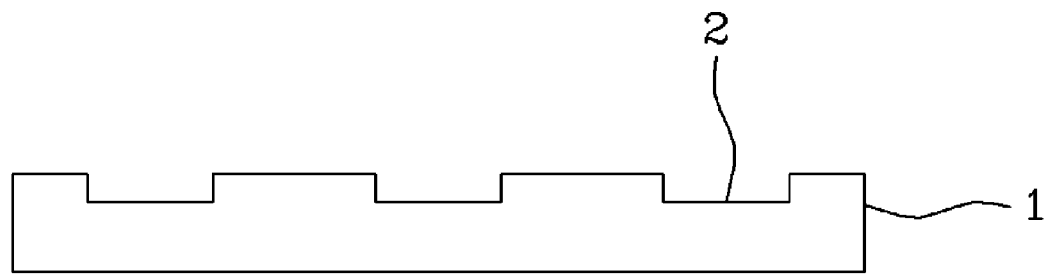
FIGS. 16 to 21 schematically illustrate some of the manufacturing process of FIG. 15.
Figure 17:
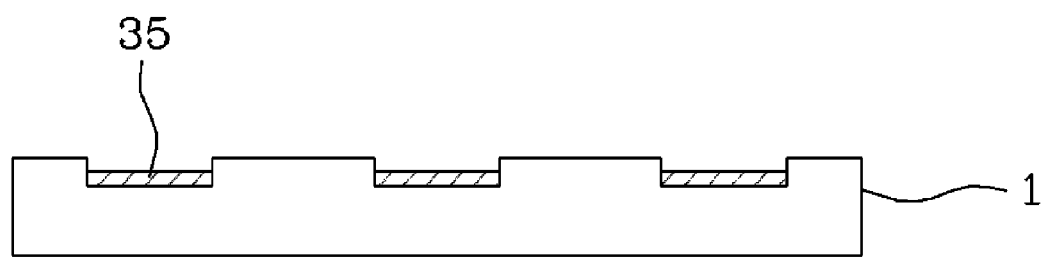

As illustrated in FIG. 16, a mold 1 having cavities 2 therein is prepared (S210). Then, a first thermoplastic synthetic resin material having a predetermined color is charged in the cavities of the prepared mold. This embodiment has the feature that the first material is charged in an amount smaller than the volume of the cavities. As such, the first material may be charged in an amount smaller than the volume of the cavities in all the cavities of the mold, or alternatively some of the cavities of the mold may be selected and filled with the first material in an amount smaller than the volume of the selected cavities. FIG. 17 illustrates the former case where the first material 35 is charged in all the cavities. Charging the first material in the cavities of the mold may be divided into the case where the first material is in a solid phase (S241) and the case where the first material in a solid phase is heated and softened (S243), which may remain the same as described above.

After filling of the cavities with the first thermoplastic synthetic resin material in an amount smaller than the volume of the cavities, a second thermoplastic synthetic resin material is charged in an amount greater than the remaining volume of the cavities on the first thermoplastic synthetic resin material. Specifically, when the first material is charged in all the cavities of the mold, the second material is charged in an amount greater than the remaining volume of the cavities except for the volume occupied by the first material, of the total volume of the cavities. Alternatively, when the first molding material is charged in some of the cavities, the second material may be charged in an amount greater than the volume of the cavities in not only the cavities containing the first molding material but also the empty cavities containing no first material.

In this embodiment, the first and the second thermoplastic synthetic resin may be arbitrarily selected from among typical thermoplastic synthetic resins, and the second thermoplastic synthetic resin may be selected so as to have different properties or different color and properties from those of the first thermoplastic synthetic resin. Also, the present invention does not exclude the case where the first thermoplastic synthetic resin is composed of a hot melt. When the first thermoplastic synthetic resin is composed of a hot melt, the resulting product may have a layered structure where the hot melt, the thermoplastic synthetic resin and the fabric are sequentially stacked upwards, or a layered structure where the hot melt, the thermoplastic synthetic resin and the hot melt are sequentially stacked upwards.

Figure 18:
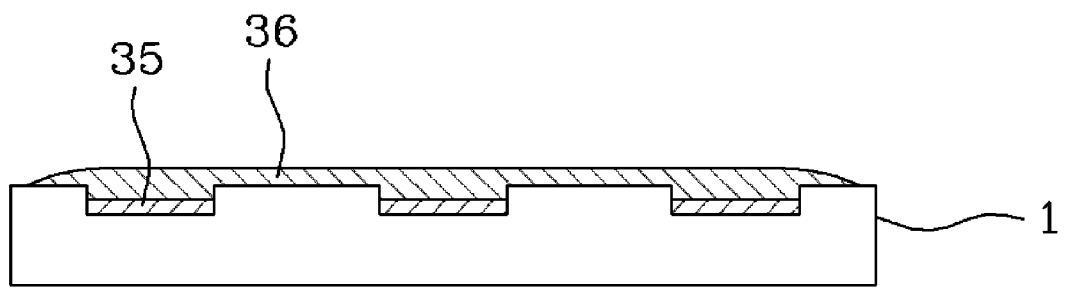

FIG. 18 illustrates charging the second material 36 when the first material 35 is charged in all the cavities. Charging the second material in the cavities, as in the first material, may be divided into the case where the second material is in a solid phase (S242) and the case where the second material in a solid phase is heated and softened (S244), which may remain the same as described above. In some cases, the present invention does not exclude charging the first and the second material in the cavities of the mold through S241 and S244, or through S243 and S242.

Figure 19:
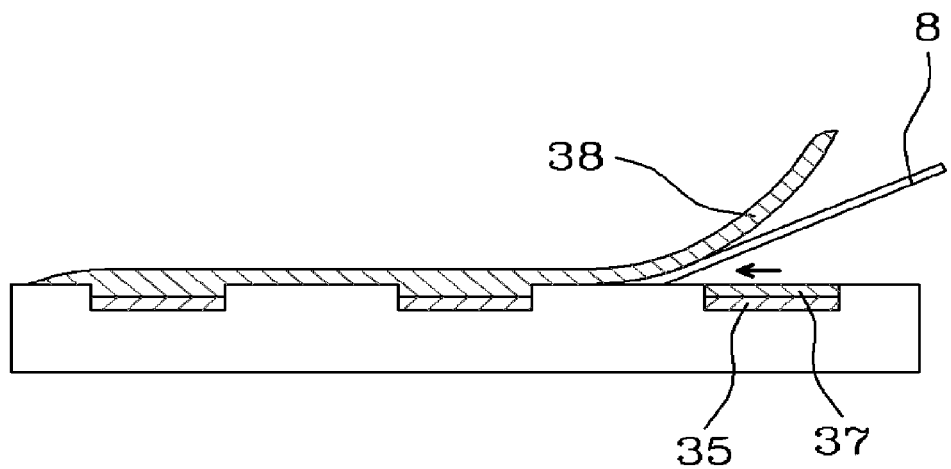

After filling of the cavities with the first and the second material, the mold is closed and then heated under pressure to thus simultaneously melt the first and the second material (S246), and the pressure is released when the cavities of the mold are fully filled with the melted materials, and the mold is opened (S247). Next, an excess of the second material which is located at the other portions except for the cavities of the opened mold is removed (S248). FIG. 19 illustrates removing an excess of the unnecessary second material 38 which is melted, other than the first material 35 and the second material 37 charged in the cavities, using a removal means 8.

Figure 20:
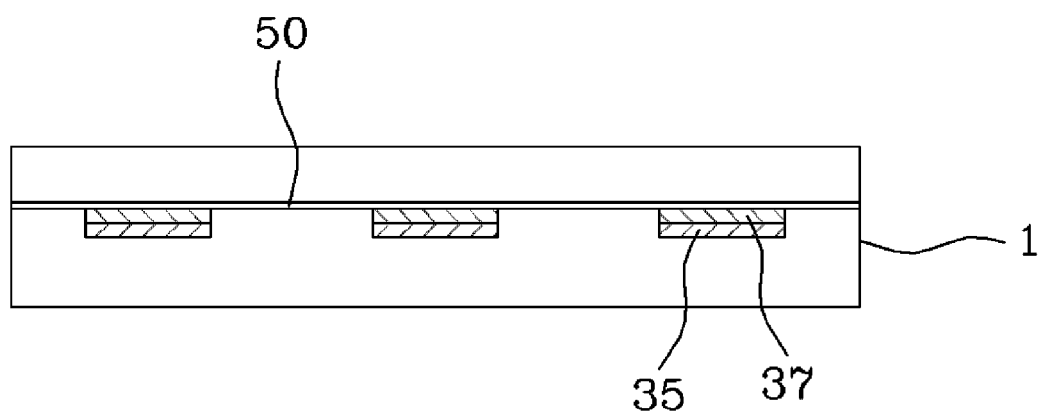

After removing of an excess of the second material, as illustrated in FIG. 20, either a fabric or a hot melt 50 is placed on the upper surface of the mold having the cavities filled with the first material 35 and the second material 37, and the mold is closed (S256). After closing of the mold, the mold is subjected to cold molding under pressure so that the first and the second material which are in contact with each other are integrated, and simultaneously, the second material penetrates into the surface and tissue of the fabric or is integrated with the hot melt. Accordingly, the second material is integrated with the first material, and as well, may be integrally attached to the fabric or is integrated with the hot melt.

Figure 21:
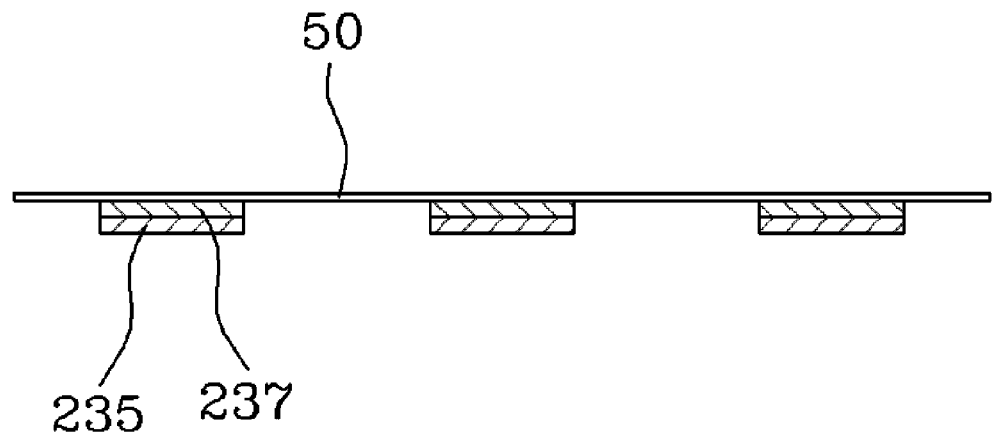

When the materials are integrally crosslinked and the second material penetrates into the surface and tissue of the fabric and is thus integrated with the fabric or is integrated with the hot melt in this way, the pressure is released and the mold is rapidly opened (S266). After completion of the cold molding process, as illustrated in FIG. 21, a thermoplastic synthetic resin product may result, which includes thermoplastic synthetic resin molded products 235, 237 having various colors and properties and configured such that the first and the second material which are in contact with each other are integrated and molded in a predetermined shape on the surface of either the fabric or the hot melt 50.

Also in this embodiment as in the aforementioned embodiments, providing a release means may be performed before heating the mold filled with the second material, and removing the release means may be carried out after opening the mold. Specifically, providing the release means (S245) may be implemented upon charging the second material (S242, S244), and removing the release means (S249) is preferably executed after S247 for opening the mold.

Also in this embodiment, in order to protect either the fabric or the hot melt placed inside the mold from the transferred heat, providing a protection means between either the fabric or the hot melt and the inner surface of the mold (S258) may be performed after placing either the fabric or the hot melt on the mold, and removing the protection means (S268) may be performed after finally opening the mold.

Also in this embodiment, in order to enhance the extent of adhesion between the fabric and the thermoplastic synthetic resin material, providing an adhesion means between the material and the fabric may be performed before placing the fabric on the upper surface of the material.

The first thermoplastic synthetic resin may be composed of a hot melt in this embodiment. Because the first thermoplastic synthetic resin is composed of a hot melt, a film or sheet having printed designs, namely, a transfer paper having no hot melt adhesive, is attached to the surface of the thermoplastic synthetic resin product manufactured according to this embodiment, namely, the surface of the first thermoplastic synthetic resin, and then heated, whereby the designs may be transferred to the surface of the first thermoplastic synthetic resin, thus easily achieving various patterns and colors.

Figure 22:
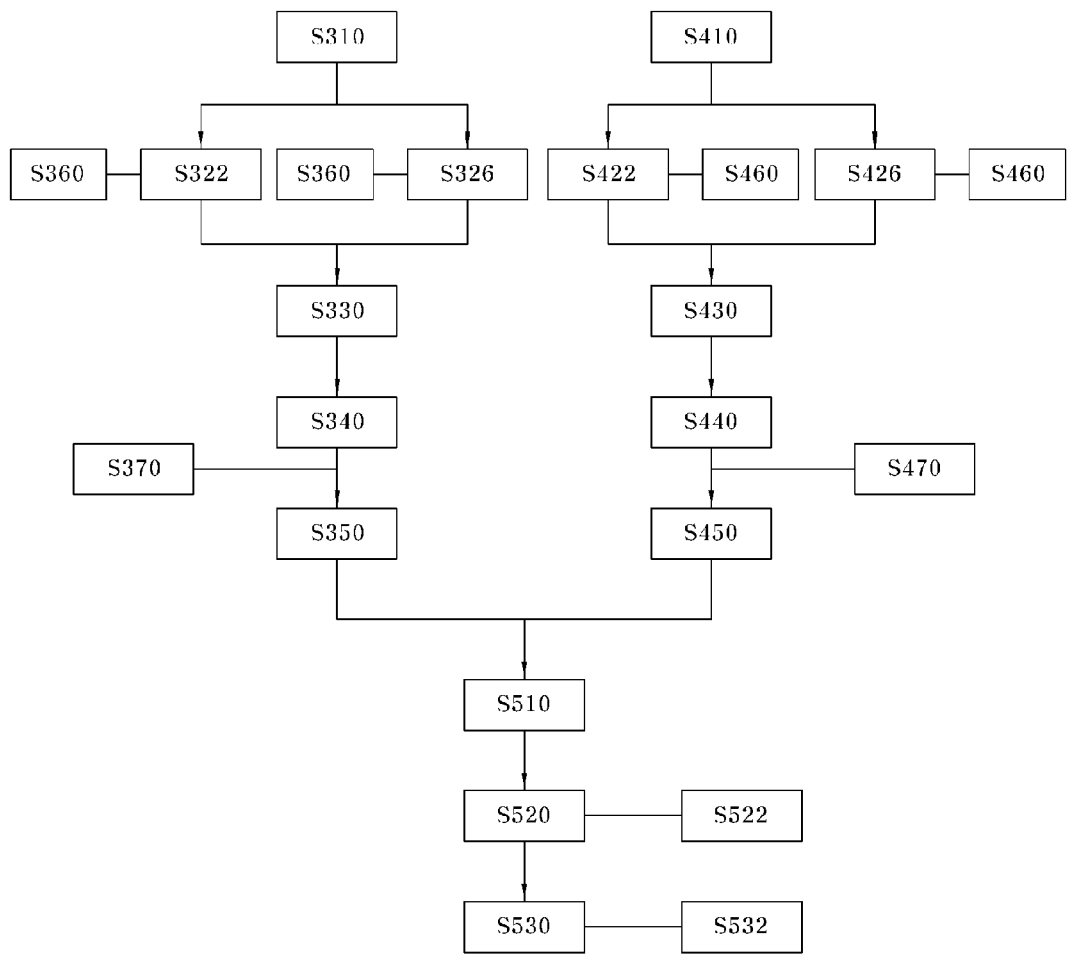
FIG. 22 schematically illustrates a manufacturing process according to yet another embodiment of the present invention.

In addition, FIG. 22 illustrates a process of manufacturing a thermoplastic synthetic resin product according to yet another preferred embodiment of the present invention. This embodiment is different from the aforementioned embodiments because it enables the formation of a product configured such that thermoplastic synthetic resin molded products having multiple colors and properties are provided on the surface of either the fabric or the hot melt using multiple molds. The description of this embodiment, which overlaps with the aforementioned embodiments and to which the description of the aforementioned embodiments may be identically applied, will be omitted.

Figure 23:
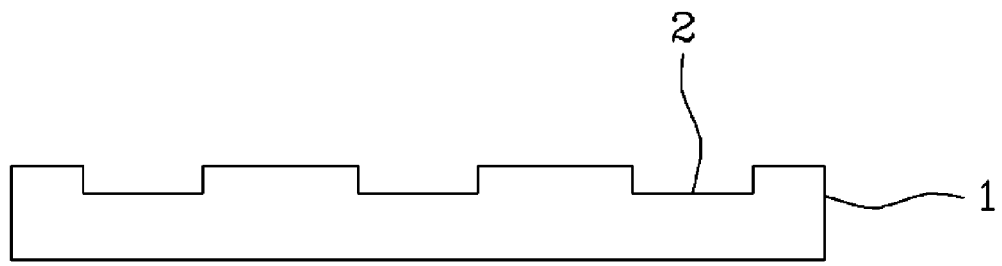
FIGS. 23 to 31 schematically illustrate some of the manufacturing process of FIG. 22.
Figure 26:
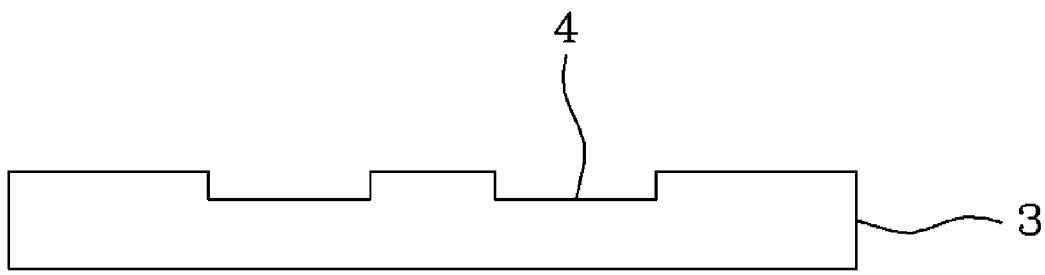

Specifically, a plurality of first molds having cavities in a predetermined shape is prepared (S310, S410). FIGS. 23 and 26 respectively illustrate two molds 1, 3 having cavities 2, 4 therein. As such, the cavities of the prepared molds may have different shapes, unlike the disclosed molds.

Figure 24:
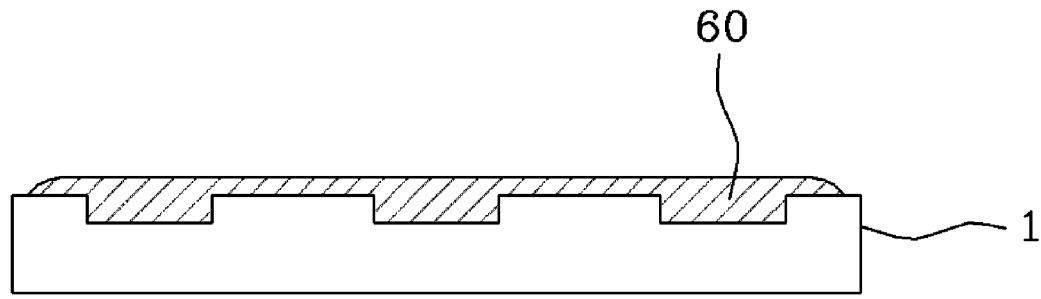
Figure 27:
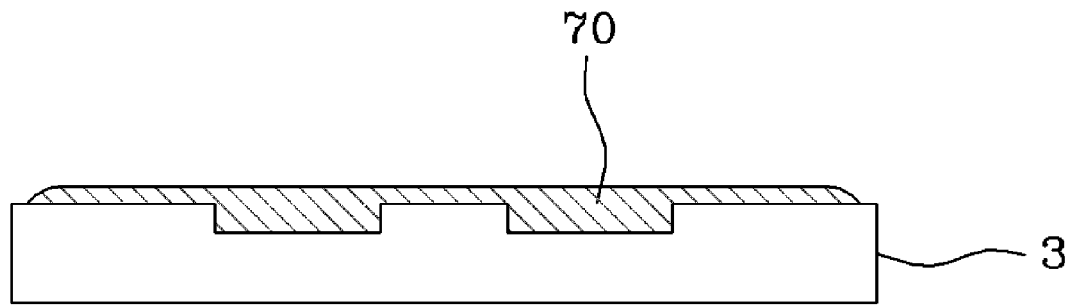

As illustrated in FIGS. 24 and 27, thermoplastic synthetic resin materials 60, 70 are respectively charged in the cavities of the prepared molds. The individual materials to be charged in the molds may have different colors or different colors and properties. Charging the materials in the cavities may be divided into the case where the materials are in a solid phase (S322, S422) and the case where the materials in a solid phase are heated and softened (S326, S426), which may remain the same as described above.

Figure 25:
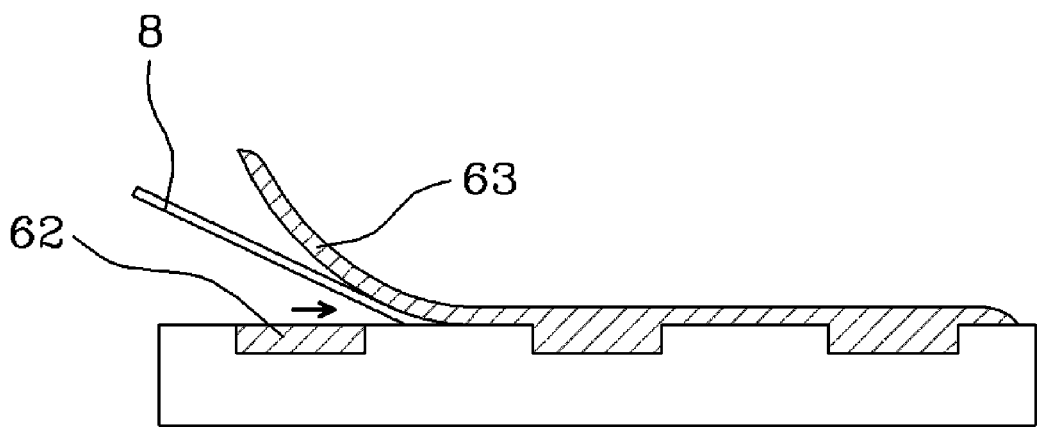
Figure 28:
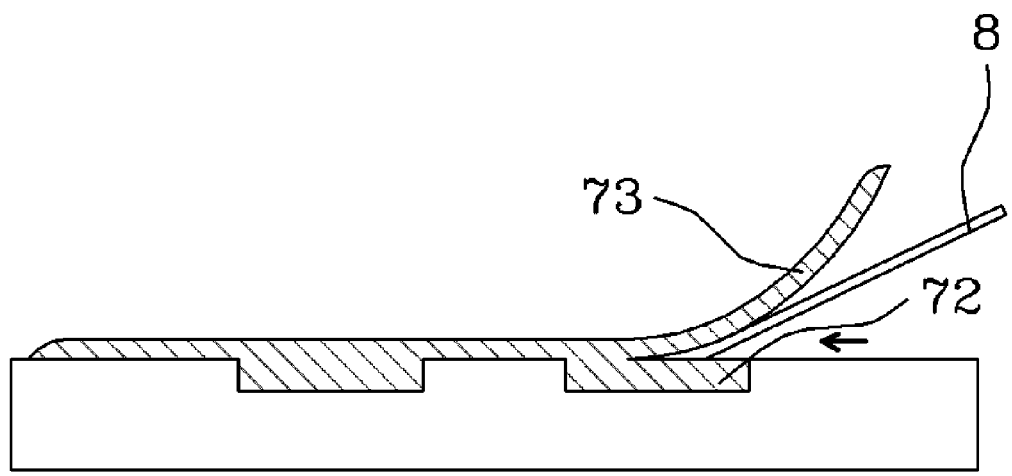

After filling of the cavities of the molds with the materials, the molds are closed and then heated under pressure, thus melting the materials (S330, S430), and when the cavities of the molds are fully filled with the melted molding materials, the molds are opened (S340, S440), and an excess of the materials which are located at the other portions except for the cavities of the molds are removed (S350, S450). FIGS. 25 and 28 respectively illustrate removing an excess of the unnecessary materials 63, 73 which are melted, other than the materials 62, 72 charged in the cavities, using a removal means 8.

Figure 29:
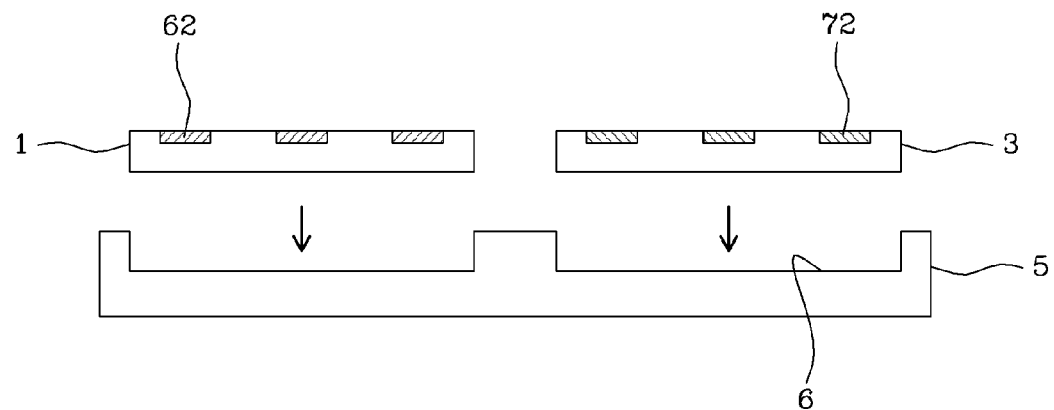
Figure 30:
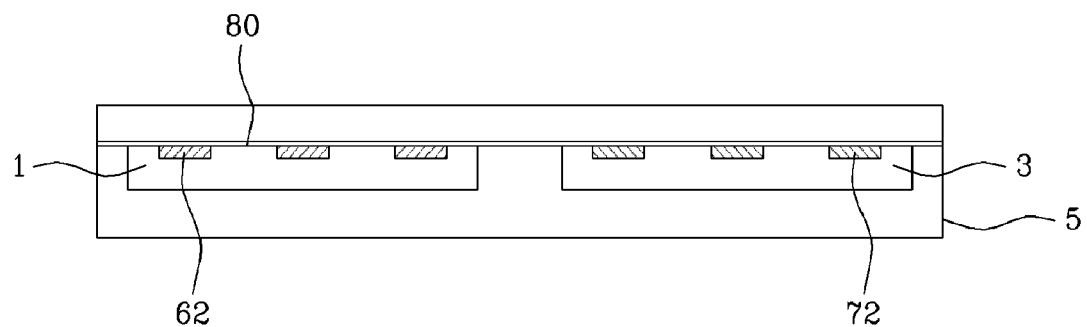
Figure 31:
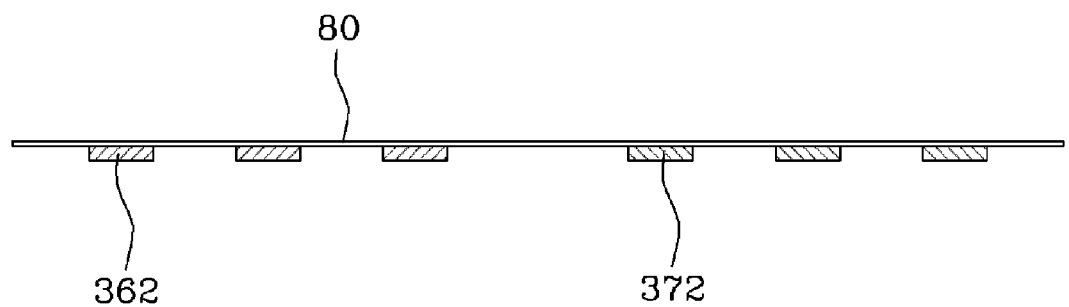

Next, as illustrated in FIG. 29, a second mold 5 having cavities 6 in a predetermined shape is prepared (S510), after which the first molds the cavities of which have been filled with the thermoplastic synthetic resin materials are disposed in the cavities of the second mold, and as illustrated in FIG. 30, either a fabric or a hot melt 80 is placed on the upper surface of the first molds disposed in the cavities of the second mold, and the second mold is closed (S520). After closing of the second mold, the second mold is subjected to cold molding under pressure, so that the materials of the first molds in contact with either the fabric or the hot melt penetrate into the surface and tissue of the fabric or are integrated with the hot melt. Accordingly, the individual materials, which have penetrated into the cavities of the first molds and the surface and tissue of the fabric, are integrated with the fabric and are simultaneously integrally attached to the fabric, or are integrated with the hot melt. When the materials of the first molds penetrate into the surface and tissue of the fabric and are thus integrated with the fabric or are integrated with the hot melt in this way, the pressure is released and the second mold is rapidly opened (S530). After completion of the cold molding process, as illustrated in FIG. 31, a thermoplastic synthetic resin product may result, which includes thermoplastic synthetic resin molded products 362, 372 having various colors and properties and formed in a predetermined shape on the surface of either the fabric or the hot melt 80.

Also, in this embodiment as in the aforementioned embodiments, providing a release means may be performed before heating the first molds filled with the materials, and removing the release means may be conducted after opening the first molds. Specifically, providing the release means (S360, S460) may be carried out upon charging the materials in the first molds (S322, S326, S422, S426), and the specific step of providing the release means may vary depending on the characteristics (solid state or soft state) of the first material, which may remain the same as mentioned above. The provided release means is preferably removed (S370, S470) after opening the molds (S340, S440).

Also in this embodiment, in order to protect either the fabric or the hot melt placed inside the molds from the transferred heat, providing a protection means between either the fabric or the hot melt and the inner surface of the molds (S522) may be performed after placing either the fabric or the hot melt on the molds, and removing the protection means (S532) may be performed after finally opening the mold.

Also in this embodiment, in order to enhance the extent of adhesion between the fabric and the thermoplastic synthetic resin materials, providing an adhesion means between the materials and the fabric may be performed before placing the fabric on the upper surface of the materials.

Figure 32:
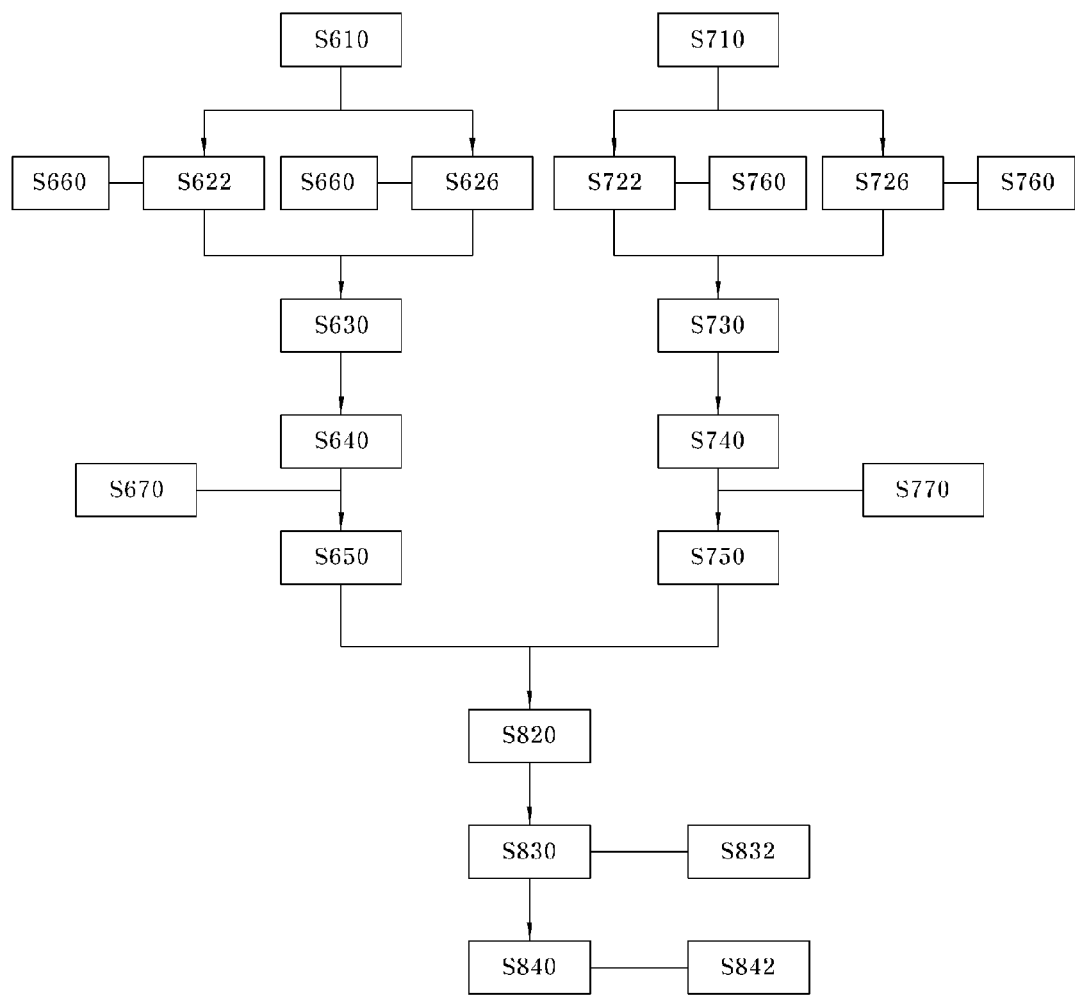
FIG. 32 schematically illustrates a manufacturing process according to further yet another embodiment of the present invention.

In addition, FIG. 32 illustrates a process of manufacturing a thermoplastic synthetic resin product according to further yet another preferred embodiment of the present invention. This embodiment is different from the aforementioned embodiments because it enables the formation of a product configured such that thermoplastic synthetic resin molded products having multiple colors and properties are provided on both sides of either the fabric or the hot melt. The description of this embodiment, which overlaps with the aforementioned embodiments and to which the description of the aforementioned embodiments may be identically applied, will be omitted.

Figure 33:
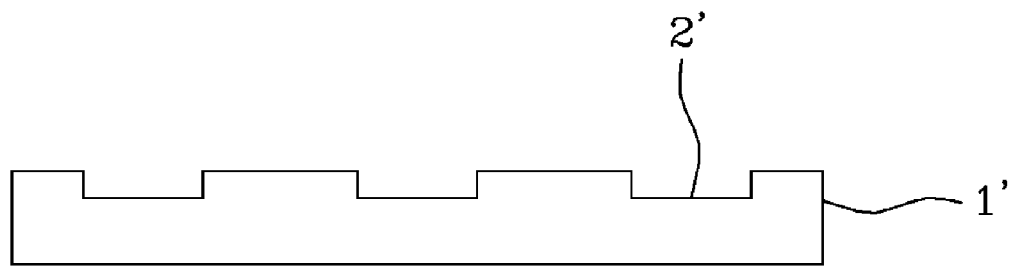
FIGS. 33 to 40 schematically illustrate some of the manufacturing process of FIG. 32.
Figure 36:
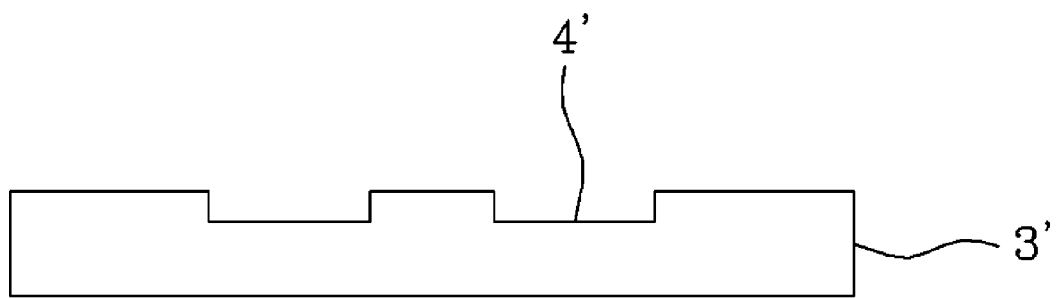

Specifically, at least two molds having cavities formed in a predetermined shape are prepared (S610, S710). The cavities of the molds are not limited in the shape thereof, and may have different shapes. FIGS. 33 and 36 respectively illustrate two molds 1', 3' having cavities 2', 4' in different shapes.

Figure 34:
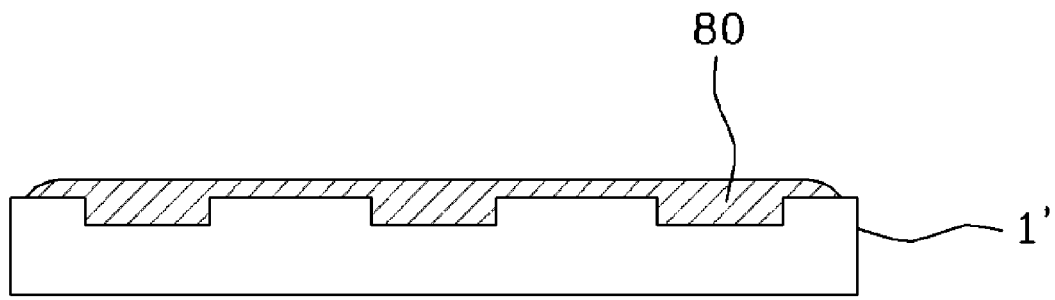
Figure 37:
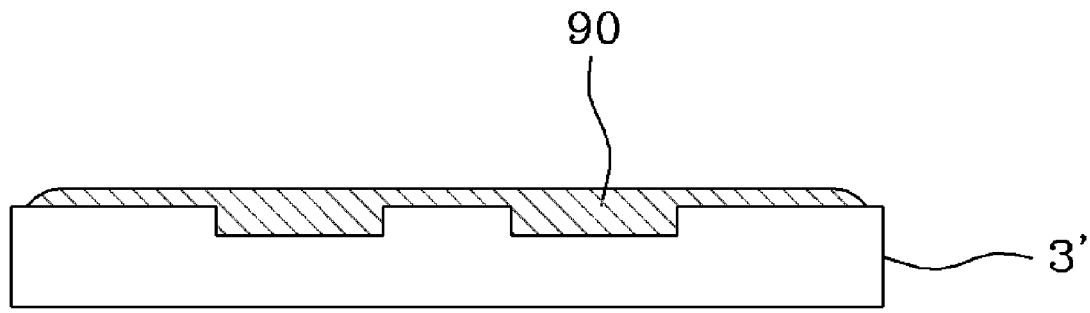

As illustrated in FIGS. 34 and 37, thermoplastic synthetic resin materials 80, 90 are respectively charged in the cavities of the prepared molds. The individual materials to be charged in the molds may have different colors or different colors and properties. Charging the materials in the cavities may be divided into the case where the materials are in a solid phase (S622, S722) and the case where the materials in a solid phase are heated and softened (S626, S726), which may remain the same as described above.

Figure 35:
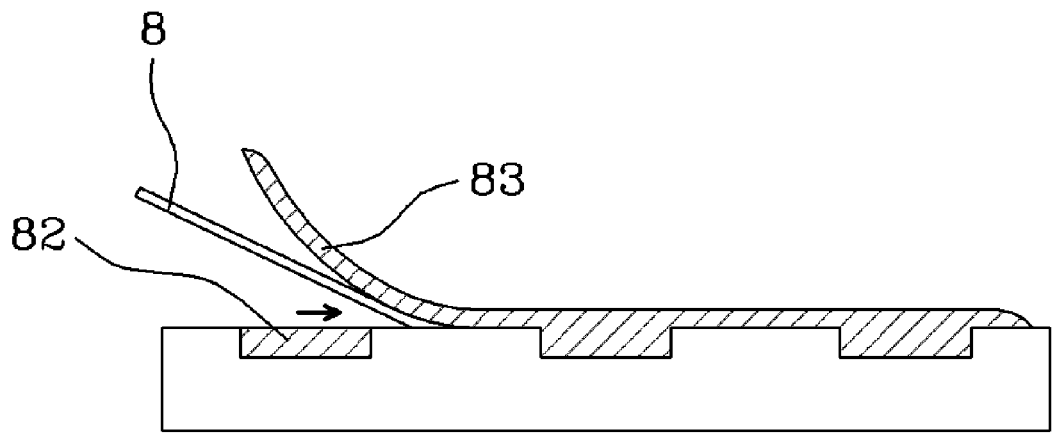
Figure 38:
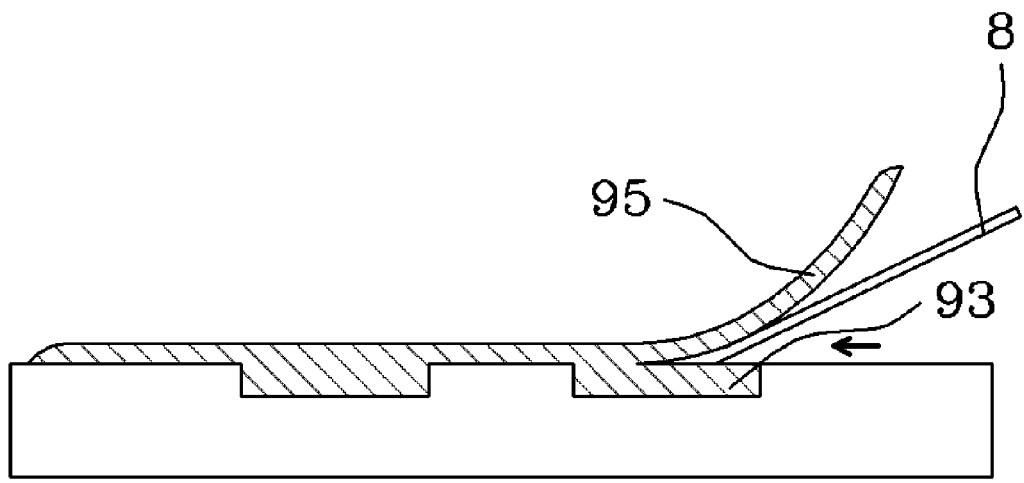

After filling of the cavities of the molds with the materials, the molds are closed and then heated under pressure, thus melting the materials (S630, S730), and when the cavities of the molds are fully filled with the melted materials, the molds are opened (S640, S740), and an excess of the materials which are located at the other portions except for the cavities of the molds are removed (S650, S750). FIGS. 35 and 38 respectively illustrate removing an excess of the unnecessary materials 83, 95 which are melted, other than the materials 82, 93 charged in the cavities, using a removal means 8.

Figure 39:
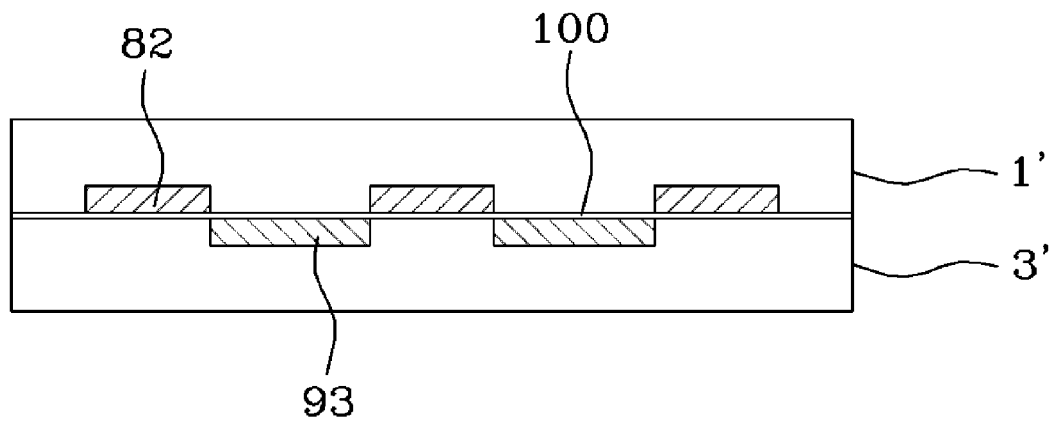
Figure 40:
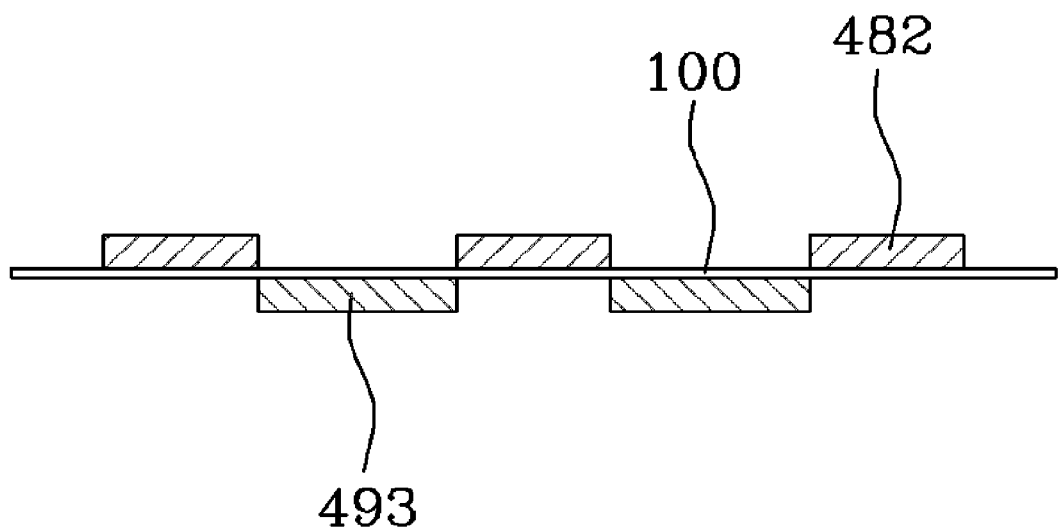

Next, either a fabric or a hot melt is disposed between the molds having the cavities filled with the materials (S820), and then the molds are combined (S830). As illustrated in FIG. 39, the molds are preferably combined in such a manner that the materials 82, 93 are positioned so as to face each other while either the fabric or the hot melt 100 is disposed therebetween. The combined molds are closed and subjected to cold molding under pressure, so that the materials of the molds which are in contact with either the fabric or the hot melt penetrate into the surface and tissue of the fabric or are integrated with the hot melt. Accordingly, the materials which have penetrated into the cavities of the molds and the surface and tissue of the fabric are integrated and simultaneously are integrally attached to the fabric, or are integrated with the hot melt. When the materials of the molds penetrate into the surface and tissue of the fabric and are thus integrated with the fabric or are integrated with the hot melt in this way, the pressure is released and the combined molds are rapidly opened (S840). After completion of the cold molding process, as illustrated in FIG. 40, a thermoplastic synthetic resin product may result, which includes thermoplastic synthetic resin molded products 482, 493 having various colors and properties and integrally formed in a predetermined shape on both sides of either the fabric or the hot melt 100.

Also, in this embodiment as in the aforementioned embodiment, providing a release means may be performed before heating the molds filled with the materials, and removing the release means may be performed after opening the molds. Specifically, providing the release means (S660, S760) may be conducted upon charging the materials in the molds (S622, S626, S722, S726), and the specific step of providing the release means may vary depending on the characteristics (solid state or soft state) of the first material, which may remain the same as mentioned above. The provided release means is preferably removed (S670, S770) after opening the molds (S640, S740).

Also in this embodiment, in order to protect either the fabric or the hot melt placed inside the molds from the transferred heat, providing a protection means between either the fabric or the hot melt and the inner surface of the mold (S832) may be implemented after placing either the fabric or the hot melt on the mold, and removing the protection means (S842) may be performed after finally opening the molds.

Also in this embodiment, in order to enhance the extent of adhesion between the fabric and the thermoplastic synthetic resin material, providing an adhesion means between the material and the fabric may be performed before placing the fabric on the upper surface of the material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a thermoplastic synthetic resin product, comprising:
    preparing a mold having a cavity formed in a predetermined shape;
    filling the cavity of the mold with a thermoplastic synthetic resin material in an amount greater than a volume of the cavity of the mold;
    heating the mold under pressure;
    releasing the pressure when the thermoplastic synthetic resin material charged in the cavity of the mold is melted by heating, and opening the mold;
    removing, of the melted thermoplastic synthetic resin material in the opened mold, the material other than the material charged in the cavity of the mold;
    placing either a fabric or a hot melt on the mold having the cavity filled with the thermoplastic synthetic resin material; and
    cooling the mold under pressure, thus integrating either the fabric or the hot melt with the thermoplastic synthetic resin material in contact with either the fabric or the hot melt.

2. A method of manufacturing a thermoplastic synthetic resin product, comprising:
    preparing a mold having a plurality of cavities formed in a predetermined shape;
    filling some of the cavities of the mold with a first thermoplastic synthetic resin material in an amount greater than a volume of some of the cavities of the mold;
    heating the mold under pressure;
    releasing the pressure when the first thermoplastic synthetic resin material of the mold is melted by heating, and opening the mold;
    removing, of the melted first thermoplastic synthetic resin material in the opened mold, the first material other than the first material charged in some of the cavities of the mold;
    filling a remaining empty cavity of the mold which is not filled with the melted first thermoplastic synthetic resin material, with a second thermoplastic synthetic resin material having a different color or different color and properties from those of the first thermoplastic synthetic resin material;
    heating the mold under pressure;
    releasing the pressure when the second thermoplastic synthetic resin material is melted by heating, and opening the mold;
    removing, of the melted second thermoplastic synthetic resin material in the opened mold, the second material other than the second material charged in the cavity of the mold;
    placing either a fabric or a hot melt on the mold having the cavities filled with the first and the second thermoplastic synthetic resin material; and
    cooling the mold under pressure, thus integrating either the fabric or the hot melt with the first and the second thermoplastic synthetic resin material which are in contact with either the fabric or the hot melt.

3. A method of manufacturing a thermoplastic synthetic resin product, comprising:
preparing a mold having a plurality of cavities formed in a predetermined shape;
filling the cavities of the mold with a first thermoplastic synthetic resin material in an amount smaller than a volume of the cavities of the mold, and then with a second thermoplastic synthetic resin material in an amount greater than a remaining volume of the cavities of the mold;
heating the mold under pressure;
releasing the pressure when the first and the second thermoplastic synthetic resin material of the mold are melted by heating, and opening the mold;
removing, of the melted second thermoplastic synthetic resin material in the opened mold, the second material other than the second material charged in the cavities of the mold;
placing either a fabric or a hot melt on the mold having the cavities sequentially filled with the first and the second thermoplastic synthetic resin material; and
cooling the mold under pressure, thus integrating the second thermoplastic synthetic resin material with the first thermoplastic synthetic resin material and either the fabric or the hot melt, which are in contact with both sides of the second thermoplastic synthetic resin material.

4. A method of manufacturing a thermoplastic synthetic resin product, comprising:
preparing at least two first molds having cavities formed in a predetermined shape;
filling the cavities of the first molds with a thermoplastic synthetic resin material in an amount greater than a volume of the cavities of the first molds;
heating the first molds under pressure;
releasing the pressure when the thermoplastic synthetic resin material of the first molds is melted by heating, and opening the first molds;
removing, of the melted thermoplastic synthetic resin material in the opened first molds, the material other than the material charged in the cavities of the first molds;
disposing the first molds having the cavities filled with the thermoplastic synthetic resin material in cavities of a second mold with a predetermined shape;
placing either a fabric or a hot melt on the first molds disposed in the cavities of the second mold and having the cavities filled with the thermoplastic synthetic resin material; and
cooling the second mold under pressure, thus integrating either the fabric or the hot melt with the thermoplastic synthetic resin material of the first molds in contact with either the fabric or the hot melt.

5. A method of manufacturing a thermoplastic synthetic resin product, comprising:
preparing at least two molds having cavities formed in a predetermined shape;
filling the cavities of the respective molds with thermoplastic synthetic resin materials having different colors or different colors and properties in an amount greater than a volume of the cavities of the molds;
heating the molds under pressure;
releasing the pressure when the thermoplastic synthetic resin materials of the molds are melted by heating, and opening the molds;
removing, of the melted thermoplastic synthetic resin materials in the opened molds, the materials other than the materials charged in the cavities of the molds;
placing either a fabric or a hot melt on any one of the molds having the cavities filled with the thermoplastic synthetic resin materials;
combining the molds such that the thermoplastic synthetic resin materials charged in the cavities thereof face each other while either the fabric or the hot melt is disposed therebetween; and
cooling the combined molds under pressure, thus integrating either the fabric or the hot melt with the thermoplastic synthetic resin materials of the molds in contact with either the fabric or the hot melt.

6. The method of claim 4, wherein the thermoplastic synthetic resin material charged in each of the first molds has a different color or different color and properties.

7. The method of claim 3, wherein the first thermoplastic synthetic resin material comprises a hot melt.

8. The method of claim 1, wherein the removing the material other than the material charged in the cavity of the opened mold is performed by cooling the mold and then using a heated removal means.

9. The method of claim 1, wherein the removing the material other than the material charged in the cavity of the opened mold is performed after separating the thermoplastic synthetic resin material from the cavities of the mold.

* * * * *